(12) United States Patent
Vargas et al.

(10) Patent No.: US 11,192,564 B2
(45) Date of Patent: Dec. 7, 2021

(54) POWER CONTROL SYSTEM FOR A VEHICLE SYSTEM

(71) Applicant: GE Global Sourcing LLC, Norwalk, CT (US)

(72) Inventors: Lucas Vares Vargas, Rio de Janeiro (BR); Harry Kirk Mathews, Jr., Niskayuna, NY (US); Brian Nedward Meyer, Fairview, PA (US); Gabriel de Albuquerque Gleizer, Rio de Janeiro (BR); Carlos Gonzaga, Rio de Janeiro (BR)

(73) Assignee: Transportation IP Holdings, LLC, Norwalk, CT (US)

( * ) Notice: Subject to any disclaimer, the term of this patent is extended or adjusted under 35 U.S.C. 154(b) by 69 days.

(21) Appl. No.: 16/675,008

(22) Filed: Nov. 5, 2019

(65) Prior Publication Data

US 2020/0062283 A1    Feb. 27, 2020

Related U.S. Application Data

(63) Continuation of application No. 15/461,548, filed on Mar. 17, 2017, now Pat. No. 10,479,379.

(30) Foreign Application Priority Data

Mar. 24, 2016    (BR) .......................... 102016006590-9

(51) Int. Cl.
*B61L 3/00*    (2006.01)
*B61L 15/00*    (2006.01)
(Continued)

(52) U.S. Cl.
CPC .............. *B61L 3/006* (2013.01); *B60T 7/128* (2013.01); *B60T 13/665* (2013.01);
(Continued)

(58) Field of Classification Search
CPC ..................................................... B60T 17/228
See application file for complete search history.

(56) References Cited

U.S. PATENT DOCUMENTS 9,096,244 B2 * 8/2015 Meyer ................... B60T 17/228
2007/0219680 A1   9/2007 Kumar et al.
(Continued)

OTHER PUBLICATIONS

4th Office Action dated Apr. 2, 2020 for corresponding Chinese Patent Application No. 2017104224170.
(Continued)

*Primary Examiner* — Thomas G Black
*Assistant Examiner* — Ana D Thomas
(74) *Attorney, Agent, or Firm* — The Small Patent Law Group LLC; Josef L. Hoffmann

(57) ABSTRACT

A power control system for a vehicle system identifies coupler nodes in the vehicle system for travel of the vehicle system along a route. The coupler nodes represent slack states of couplers between vehicles in the vehicle system. The system also determines combined driving parameters at locations along the route where a state of the coupler nodes in the vehicle system will change within the vehicle system during the upcoming movement of the vehicle system. The system determines a restriction on operations of the vehicle system to control the coupler nodes during the upcoming movement of the vehicle system and to distribute the combined driving parameters among two or more of the vehicles.

16 Claims, 12 Drawing Sheets

(51) Int. Cl.
    *B61L 27/00*         (2006.01)
    *B60T 17/22*         (2006.01)
    *G01C 21/20*        (2006.01)
    *B60T 13/66*        (2006.01)
    *B60T 7/12*          (2006.01)
    *B61H 13/20*        (2006.01)

(52) U.S. Cl.
    CPC ............ *B60T 17/228* (2013.01); *B61H 13/20* (2013.01); *B61L 3/008* (2013.01); *B61L 15/0072* (2013.01); *B61L 15/0081* (2013.01); *B61L 27/0016* (2013.01); *B61L 27/0027* (2013.01); *G01C 21/20* (2013.01); *Y02T 10/72* (2013.01)

(56) References Cited

U.S. PATENT DOCUMENTS

2008/0128562 A1     6/2008     Kumar et al.
2009/0090818 A1     4/2009     Kumar
2010/0174427 A1     7/2010     Sivasubramaniam et al.

OTHER PUBLICATIONS

English translation of the 4th Office Action dated Apr. 2, 2020 for corresponding Chinese Patent Application No. 2017104224170.
Russian Office Action dated Mar. 13, 2020 for corresponding Eurasian Patent Application No. 201790449/31.
English translated the Russian Office Action dated Mar. 13, 2020 for corresponding Eurasian Patent Application No. 201790449/31.
Patent Search Report issued for corresponding Eurasian Patent Application No. 202190450 dated May 26, 2021 (3 pages).
English translation of the Patent Search Report issued for corresponding Eurasian Patent Application No. 202190450 dated May 26, 2021 (2 pages).
Technical Report issued for related Brazilian Patent Application No. BR102016006590 dated Jul. 2, 2021 (4 pages).

* cited by examiner

POWER CONTROL SYSTEM FOR A VEHICLE SYSTEM

CROSS-REFERENCE TO RELATED APPLICATIONS

This application is a continuation of and claims priority to U.S. patent application Ser. No. 15/461,548, which was filed on 17 Mar. 2017 that claims priority to foreign filed Brazilian Application No. 102016006590-9 filed 24 Mar. 2016, the entire disclosures of which are incorporated herein by reference.

FIELD

Embodiments of the subject matter disclosed herein relate to distributing and limiting power among propulsion-generating vehicles in a vehicle system to control node dynamics within the vehicle system.

BACKGROUND

Some known vehicle systems include multiple vehicles connected together so that the vehicles can travel together. The vehicle systems may have propulsion-generating vehicles and optionally non-propulsion-generating vehicles that travel together along a route. Some vehicle systems can include one or more groups of propulsion-generating vehicles referred to as consists.

The operations of the propulsion-generating vehicles can be coordinated with each other. With respect to rail vehicles, some locomotives may be remotely controlled from another locomotive in the vehicle system. For example, distributed power (DP) control of the locomotives may involve all locomotives in the rail vehicle system (e.g., a train) being controlled to have the various throttle and/or brake settings at the same time.

Because vehicle systems may be very long, different segments of the vehicle systems may experience different grades and/or curvatures in a route at the same time. Depending on the locations of the propulsion-generating vehicles in the vehicle system and the throttle and/or brake settings of the propulsion-generating vehicles, one or more nodes may be created within the vehicle system.

During movement of a vehicle system, the nodes within the vehicle system may move within the vehicle system. In some circumstances, the nodes may move toward each other until the plural nodes are at the same location within the vehicle system. This event may be referred to as a node collision. Vehicle systems may break apart into smaller segments at node collisions and/or vehicles within the vehicle system may collide with each other at node collisions. Additionally, the relative movement and/or collision of nodes in the vehicle system may impair the handling of vehicle systems.

BRIEF DESCRIPTION

In one embodiment, a power control system for a vehicle system includes one or more processors configured to identify coupler nodes in a vehicle system for travel of the vehicle system along a route. The coupler nodes are representative of slack states of couplers between vehicles in the vehicle system. The one or more processors also are configured to determine one or more combined driving parameters at one or more locations along the route where a state of one or more of the coupler nodes in the vehicle system will change within the vehicle system during the upcoming movement of the vehicle system. The one or more processors also are configured to determine a restriction on operations of the vehicle system to control the coupler nodes during the upcoming movement of the vehicle system and to distribute the one or more combined driving parameters among two or more of the vehicles by determining individual driving parameters for the two or more vehicles based on the restriction that is determined. The individual driving parameters include one or more throttle settings or brake settings of the vehicles.

In one embodiment, a method for dictating power settings for a vehicle system includes identifying coupler nodes in a vehicle system for travel of the vehicle system along a route. The coupler nodes represent slack states of couplers connected to one or more vehicles in the vehicle system. The method also includes determining one or more combined driving parameters at one or more locations along the route where a state of one or more of the coupler nodes in the vehicle system will change within the vehicle system during the upcoming movement of the vehicle system and determining an individual driving parameter for one or more vehicles based on the restriction that is determined. The individual driving parameter include a power setting of the one or more vehicles.

In one embodiment, a method for controlling a vehicle system includes determining a location along a route during an upcoming trip of a vehicle system that coupler nodes in the vehicle system will collide with each other and distributing a power output among two or more propulsion-generating vehicles on opposite sides of at least one of the coupler nodes in the vehicle system. The power output prevents the coupler nodes from colliding with each other at the location along the route. The method also includes generating a trip plan for the propulsion-generating vehicles in the vehicle system based on the power output that is distributed. The trip plan designates one or more moving speeds, throttle settings, or brake settings of the vehicle system as a function of distance along the route.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
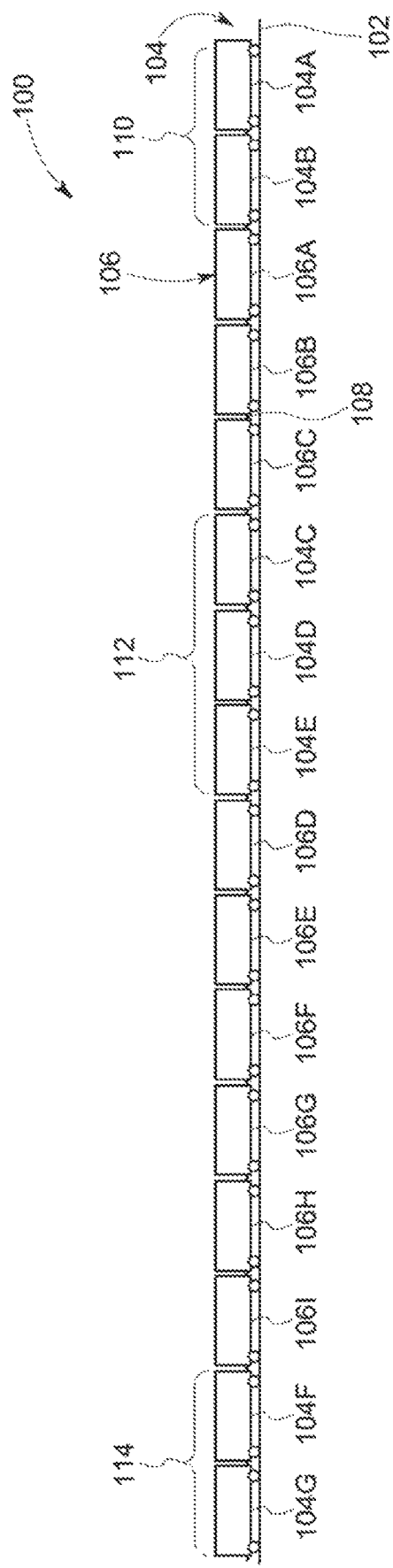
FIG. 1 illustrates a schematic diagram of one example of a vehicle system traveling along a route.
Figure 2:
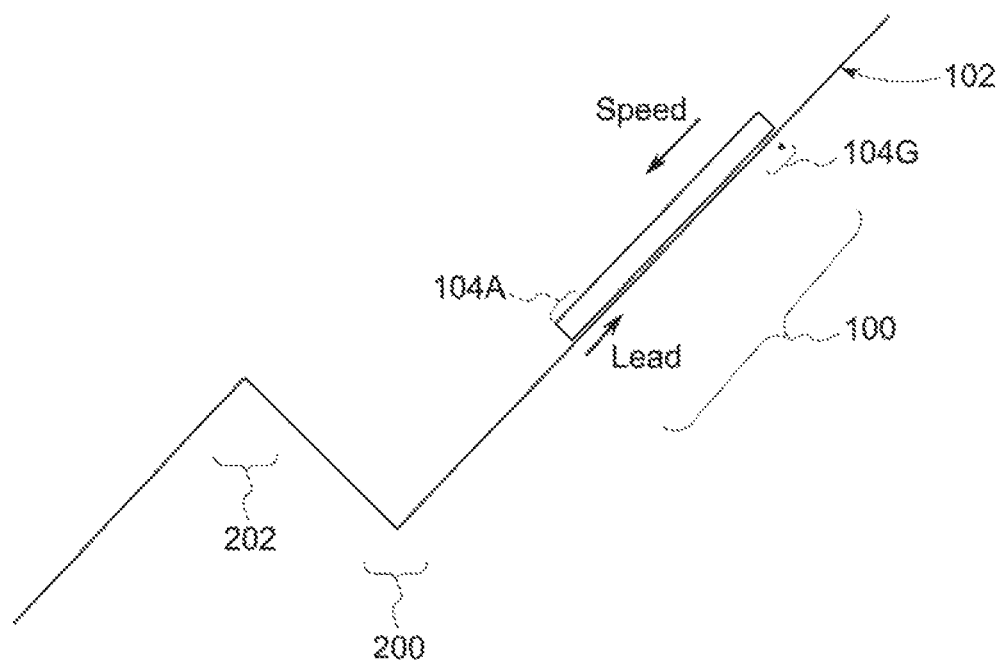
FIG. 2 schematically illustrates movement of the vehicle system along a segment of a route having a valley and a peak according to one example of a node collision.

In accordance with one or more embodiments of the inventive subject matter described herein, power control systems and methods are provided that identify driving parameters (e.g., power settings such as throttle settings, brake settings, moving speeds, tractive and/or braking effort or force, acceleration, rate of change in tractive and/or braking effort or force, etc.), conditions (e.g., which vehicles are braking or generating propulsive effort at various times and/or locations, grades of the route, curvatures of a route, etc.), and/or transitions (e.g., excessive and/or rapid braking with remotely located vehicles in the vehicle system) that can result in undesirable dynamics. These dynamics may result in collisions of big groups of vehicles in the vehicle system, breaks in the vehicle system between different vehicle groups, etc., and are avoided or eliminated by the systems and methods along a trip of the vehicle system.

The systems and methods can identify the positions and movements of nodes as locations between pairs of vehicles in the vehicle system where there is relative movement between the vehicles in the pairs with little to no effect on forces exerted on the couplers between the vehicles in the pairs. A node may represent a location of a coupler in the vehicle system that is connected with at least one vehicle (but not necessarily between two vehicles) that is in a slack state. A coupler in a slack state can be a coupler that is experiencing relatively little force. As one example, a coupler that connects two vehicles may be in a slack state (and thereby represent a node) when the coupler is not under tension (e.g., is not above a designated threshold, such as 10% of the maximum allowable tensile load that the coupler is able to withstand without breaking) and is not under compression (e.g., is not above a designated threshold, such as 10% of the maximum allowable compressive load that the coupler is able to withstand without breaking). As another example, a coupler that connects two vehicles can be in a slack state and thereby represent a node when the coupler can move between and relative to these vehicles while the force exerted on the coupler changes very little. For example, the percentage or fraction of change in the movement or position of the coupler relative to the vehicles connected by the coupler may change by a greater amount than the change in force exerted on the coupler. In another example, a coupler may be in a slack state and represent a node when the coupler is between another coupler that is under tension and another coupler that is under compression. In another example, a coupler may be in a slack state and represent a node when the coupler is located at an end of the vehicle system, and the coupler is not under any load (e.g., is not compressed between the vehicle system and an external object).

The nodes can be identified based on a steady state force model of the vehicle system or dynamic simulation of movement of the vehicle system. For example, the systems and methods described herein can identify where node collisions will or are more likely than not to occur during an upcoming trip or upcoming segment of a vehicle system. Optionally, the systems and methods described herein can identify other types of node events, such as the movement of nodes within a vehicle system, speeds of movement of the nodes within the vehicle system (which differ from the moving speed of the vehicle system), the number of nodes, the creation of nodes, and/or the elimination of nodes in the vehicle system.

The systems and methods can then create or modify a trip plan that designates driving parameters (e.g., power settings such as throttle settings, brake settings, or other operational settings that control movement of the vehicle system) as a function of time and/or distance along a route. In one example, the trip plan can designate air brake settings, dynamic brake settings, or other settings related to braking. The driving parameters designated by the trip plan can efficiently distribute the power between the propulsion-generating vehicles in such a way to avoid or eliminate node collisions, control (e.g., reduce or increase) the movement of nodes within the vehicle system, and/or create or eliminate one or more nodes. While the description herein focuses on the driving parameters being throttle and/or brake settings, alternatively, the driving parameters may represent moving speeds of the vehicle system, tractive power or effort generated by vehicles in the vehicle system, braking power or effort generated by vehicles in the vehicle system, acceleration of vehicles in the vehicle system, rate of change in tractive and/or braking effort or force, etc.

The systems and methods can identify conditions where excessive braking with remote vehicles (e.g., propulsion-generating vehicles that are not located at the front or leading end of the vehicle system) can be dangerous to operation of the vehicle system. The systems and methods optionally can identify conditions where excessive throttling can be dangerous for forces between vehicles in the vehicle system, and/or identify conditions where excessing braking and/or throttle changes with lead vehicles can be dangerous. The trip plans may be created and/or modified to avoid these types of situations. The systems and methods can identify driving parameter envelopes (e.g., ranges of allowable driving parameters) for the throttle and/or brake settings that eliminate or reduce node collisions (e.g., relative to the vehicle system traveling along the same route according to other driving parameters, such as those driving parameters that cause the vehicle system to travel at the speed limit of the route). Optionally, the systems and methods can identify the driving parameter envelopes or allowable ranges that control (e.g., reduce or increase) the movement of nodes within the vehicle system and/or create or eliminate one or more nodes.

The trip plan and/or limitations determined by the systems and methods can be applied using automatic control strategies, such as by a controller of the vehicle system automatically controlling the vehicle system according to the trip plan. Optionally, the trip plan and/or limitations may be used to notify or coach an operation of a vehicle system how to control the vehicle system. The trip plan may be used by the controller of the vehicle system to prevent or stop an operator from controlling movement of the vehicle system in a way that contradicts or falls outside of limitations designated by the trip plan.

A mathematical model of the vehicle system can describe the behavior of nodes in the vehicle system as a function of speed of the vehicle system, throttle and/or brake settings at individual locations in the vehicle system, and/or route terrain (e.g., grades and/or curvatures of the route). A variety of physics based models may be used to describe the behavior of nodes, such as a rope based model, a lumped mass model, or another model, as described herein.

With such model, subsets or sets of tractive effort power setting combinations among propulsion-generating vehicles in the vehicle system are determined that guarantee that the nodes in the vehicle system are within a safe region (e.g., no collision of nodes) or to guarantee that the nodes are moving within the vehicle system at safe speeds (e.g., the nodes are not moving toward each other by a speed that is faster than the moving speed of the vehicle system). A tractive effort combination can include the total propulsive effort or force generated by the vehicle system and/or the total braking effort or force generated by the vehicle system.

The propulsion-generating vehicles in a vehicle system may be able to change notch settings between values of negative eight (indicating applying brakes at an upper braking limit) to positive eight (indicating applying the throttle at an upper throttle limit). A combined power setting of negative two may represent an effective brake setting of two for the propulsion-generating vehicles. Not all of the propulsion-generating vehicles may use the same setting to provide the combined power setting of negative two, however. For example, a larger number of vehicles may use a setting of negative one while a smaller number of vehicles in the same vehicle system may use a setting of negative six to provide an effective braking settings for all of these vehicles of negative two.

Once the combinations of tractive effort that are dangerous in terms of node behavior are identified, the tractive effort may be distributed among the propulsion-generating vehicles in order to avoid node collisions, to control (e.g., reduce or increase) the movement of nodes within the vehicle system, and/or to create or eliminate one or more nodes. The systems and methods may identify combined power settings (e.g., notch settings) that provide sufficient degrees of freedom to allow the tractive effort combination to be split or divided among the vehicles to avoid node collisions, to control the movement of nodes within the vehicle system, and/or to create or eliminate one or more nodes. For example, some combined power setting may not allow for the total propulsive force and/or total braking force to be divided among the propulsion-generating vehicles while avoiding node collisions, while controlling the movement of nodes within the vehicle system, and/or while creating or eliminating one or more nodes. The systems and methods can determine envelopes that dictate allowable ranges of combined power settings to provide sufficient degrees of freedom to allow the tractive effort to be divided among the vehicles in the vehicle system.

Alternatively, instead of determining power settings for two or more different groups or sets of propulsion-generating vehicles in the same vehicle system, the power settings may be determined for a single group or a single vehicle. For example, a vehicle or group of vehicles may be controlled according to determined power settings to prevent a node collision or otherwise control nodes within a vehicle system, without also determining power settings for another vehicle or group of vehicles.

The systems and methods can examine deviations that may exist when applying the solution in the real world. For example, the trip plan that controls nodes may be created or modified for an upcoming trip or segment of a trip. Controlling nodes may include avoiding node collisions, controlling the movement of nodes within the vehicle system, and/or creating or eliminating one or more nodes. During travel of the vehicle system for the upcoming trip or segment of the trip, the tractive effort generated by the vehicle system may deviate from the tractive effort dictated by the trip plan. These deviations may be the result of a variety of factors, such as different drag, wind, travel restrictions (e.g., slow orders), or the like, than the factors used to create or modify the trip plan. The systems and methods provide appropriate directions to the vehicle controller or the operator of the vehicle system that are to be followed if more or different propulsive forces and/or braking forces are needed, while controlling the nodes. These directions can include instructions on how to divide additional tractive effort and/or braking effort that is needed among the propulsion-generating vehicles.

By limiting the driving parameters (e.g., power settings) that can be used by the propulsion-generating vehicles to cause the vehicle system to generate safe tractive effort combinations (e.g., the effective power setting of the vehicles), the systems and methods described herein can provide for the safe travel of the vehicle system. Node collisions that can result in the vehicle system breaking into smaller segments are avoided, and the number of times that airbrakes in the vehicle systems are used may be reduced when compared to heuristic rules that exist in the field. For example, airbrakes may be used in some rail vehicle systems to avoid run-ins or run-outs between segments of the vehicle systems, but overuse of airbrakes can cause the airbrakes to overheat and cause a significant risk to the safety of the rail vehicle systems.

Some known systems use heuristic rules that restrict operators from using dynamic braking (DB) on remote locomotives of a rail vehicle system during travel through certain terrain features. This reduces the DB power of the rail vehicle system, which can increase the need for more airbrake usage. As described above, however, increased usage of airbrakes can pose a significant safety risk.

The systems and methods described herein can dictate limitations on driving parameters to control the nodes, while also decreasing the usage of airbrakes relative to other systems using heuristic rules described above. This allows for avoiding critical vehicle handling events (e.g., node collisions) with small impacts on fuel consumption and/or travel time.

Some vehicle systems include end-of-car cushioning (EOCC) couplers at one or more vehicles of the vehicle systems. The nodes experiencing forces at preload values and the nodes at couplers that are at a full stroke position can create collisions that break the couplers. The systems and methods described herein can create trip plans that significantly mitigate breaks in vehicle systems having EOCC couplers.

In one embodiment, the systems and methods described herein can identify driving parameters likely to cause node collisions and/or driving parameters that avoid the node collisions without input from sensors onboard the vehicle system, such as sensors that measure forces exerted on couplers ("coupler forces"). Alternatively, the systems and methods may use the coupler forces measured by sensors to create and/or modify a trip plan as described herein. Other types of sensors can be used to provide more reliable measurements of the elevation and slope as the vehicle system passes (in a section where an existing database is not complete for example) to improve the performance of the inventive subject matter described herein.

FIG. 1 illustrates a schematic diagram of one example of a vehicle system 100 traveling along a route 102. The vehicle system 100 includes several vehicles 104, 106 operably coupled with each other. The vehicles may be mechanically coupled with each other, such as by couplers 108. The vehicles 104 (e.g., vehicles 104A-G) represent propulsion-generating vehicles, such as vehicles capable of generating propulsive force to propel the vehicle system 100 along the route 102. Examples of propulsion-generating vehicles 104 include locomotives, other off-highway vehicles (e.g., vehicles that are not designed for or permitted to travel on public roadways), automobiles (e.g., vehicles that are designed for traveling on public roadways), marine vessels, and the like. In one embodiment, the vehicles 104 represent locomotives and the vehicles 106 represent rail cars. The vehicles 104 may be fuel-powered vehicles (e.g., engines that consume fuel are used to generate propulsive force by creating electric current to power motors or to rotate axles and wheels), electric-powered vehicles (e.g., onboard or off board sources of electric current are used to power motors to generate propulsive force), and/or hybrid powered vehicles (e.g., vehicles that are powered by fuel-consuming engines and other sources of electric current). The vehicles 106 (e.g., vehicles 106A-I) represent non-propulsion-generating vehicles, such as rail cars or other units that are propelled along the route 102 by the propulsion-generating vehicles 104.

The term "vehicle" as used herein can be defined as a mobile machine that transports at least one of a person, people, or a cargo. For instance, a vehicle can be, but is not limited to being, a rail car, an intermodal container, a locomotive, a marine vessel, mining equipment, construction equipment, an automobile, and the like. A "vehicle system" includes two or more vehicles that are interconnected with each other to travel along a route. For example, a vehicle system can include two or more vehicles that are directly connected to each other (e.g., by a coupler) or that are indirectly connected with each other (e.g., by one or more other vehicles and couplers). Groups or sets 110, 112, 114 of one or more vehicles 104 in each group or set may be referred to as consists. A set 110, 112, 114 that is ahead of another set 110, 112, 114 along a direction of travel of the vehicle system 100 may be referred to as leading set while the other set may be referred to as a remote or trailing set.

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. "Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk. "Computer memory", as used herein, refers to a storage device configured to store digital data or information which can be retrieved by a computer or processing element. "Controller," "unit," and/or "module," as used herein, can to the logic circuitry and/or processing elements and associated software or program involved in controlling an energy storage system. The terms "signal", "data", and "information" may be used interchangeably herein and may refer to digital or analog forms.

At least one technical effect described herein includes determining driving parameters for a trip of a vehicle system. The driving parameters can dictate operational settings (e.g., power settings such as throttle notch settings, brake settings, or other settings) of propulsion-generating vehicles in the vehicle system that control nodes. The driving parameters may be generated before the vehicle system embarks on the trip and/or generated while the vehicle system is moving along a route during the trip. The driving parameters may be defined by a trip plan.

In one embodiment, power settings (e.g., throttle settings such as power output, horsepower, speed, and the like and/or brake settings) of the vehicle system 100 may be the driving parameters that are controlled to drive the vehicle system 100 along the route 102 from an origin location to a destination location. The driving parameters may be automatically controlled such that the throttle settings and/or braking settings of the vehicles 104, 106 are controlled without operator intervention involved in changing these parameters. Alternatively or additionally, the vehicle system 100 may provide prompts and notices to an operator that direct the operator how to manually control the vehicle system 100 according to the driving parameters. For example, the system 100 may provide prompts to an operator to instruct the operator of which driving parameters to use at a current time and/or which settings to use at upcoming times when the system 100 arrives at one or more upcoming locations.

The driving parameters may be controlled by designating operational settings of the vehicle system 100 at one or more locations along the route 102. By way of example, these operational settings can include power settings (e.g., throttle notch settings) that control the power output from the propulsion-generating vehicles 104 and brake settings (e.g., dynamic brake settings) that control the braking efforts of the propulsion-generating vehicles 104 and/or the non-propulsion generating vehicles 106. The operational settings that are designated for a trip of the vehicle system 100 from a first location to a different, second location along the route 102 may be referred to as a trip plan. The designated operational settings can be expressed as a function of time elapsed during a trip along the route 102 and/or distance along the route 102 in the trip plan. The designated operational settings can be computed in order to improve handling (e.g., control) of the vehicle system 100 by controlling or changing a state of one or more nodes in the vehicle system. For example, the designated operational settings can be determined in order to reduce or eliminate node collisions or otherwise control the nodes. While the description herein focuses on avoiding node collisions, the same embodiments may be used to otherwise control the nodes, such as by controlling movement of the nodes within the vehicle system 100, creating one or more nodes within the vehicle system 100, or eliminating one or more nodes from the vehicle system 100.

FIGS. 2 through 6 schematically illustrate movement of the vehicle system 100 along a segment of the route 102 having a valley 200 and a peak 202 according to one example of a node collision. The vehicle system 100 is illustrated in FIGS. 2 through 6 as a continuous line, with different segments of the line represent different vehicles 104, 106. During travel down the route 102 toward the valley 200, a lead propulsion-generating vehicle 104A may be generating braking effort in order to slow movement of the vehicle system 100 toward the valley 200. A remote propulsion-generating vehicle 104G (e.g., located at the tail end of the vehicle system 100) may be operating in idle by not generating propulsive effort or braking effort. The entire vehicle system 100 may be experiencing compressive (buff) forces, or forces that propel the vehicle system 100 forward and toward the valley 200 due to the negative grade of the route 102 being traveled upon and/or propulsive forces generated by one or more of the propulsion-generating vehicles 104.

Figure 3:
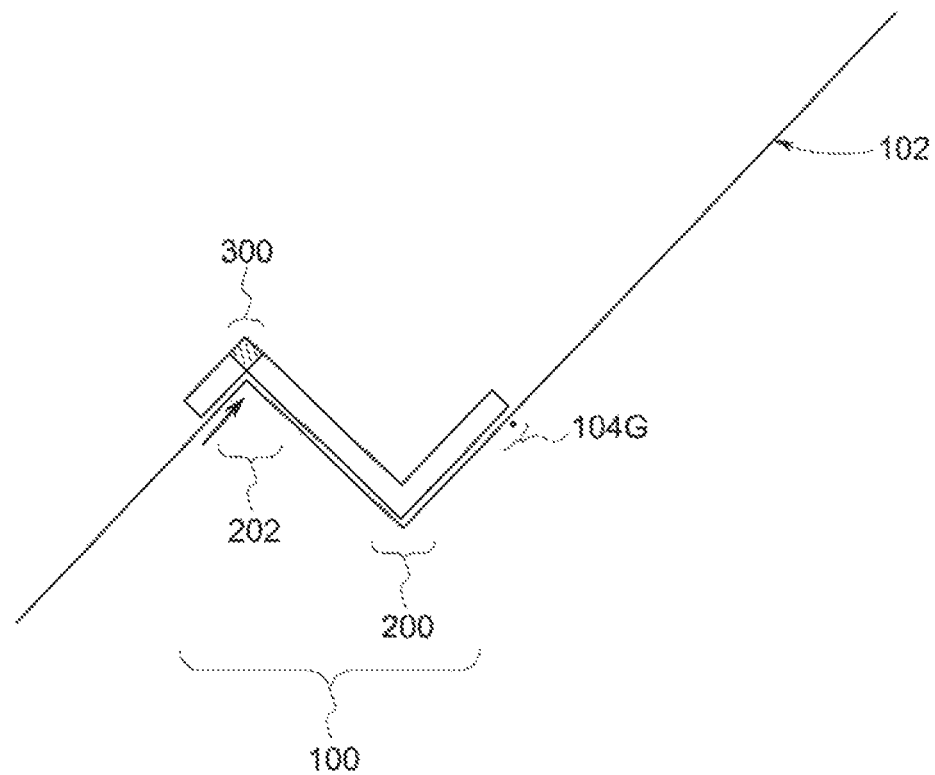
FIG. 3 schematically illustrates movement of the vehicle system along another segment of the route shown in FIG. 2.

As shown in FIG. 3, as the vehicle system 100 travels over the peak 202 in the route 102, a set 300 of vehicles 104 and/or 106 in the vehicle system 100 may become stretched relative to other vehicles 104, 106. For example, the peak 202 may cause the vehicles 104 and/or 106 on opposite sides of the peak 202 to move farther from each other relative to other pairs of vehicles 104 and/or 106 in the vehicle system 100.

Figure 4:
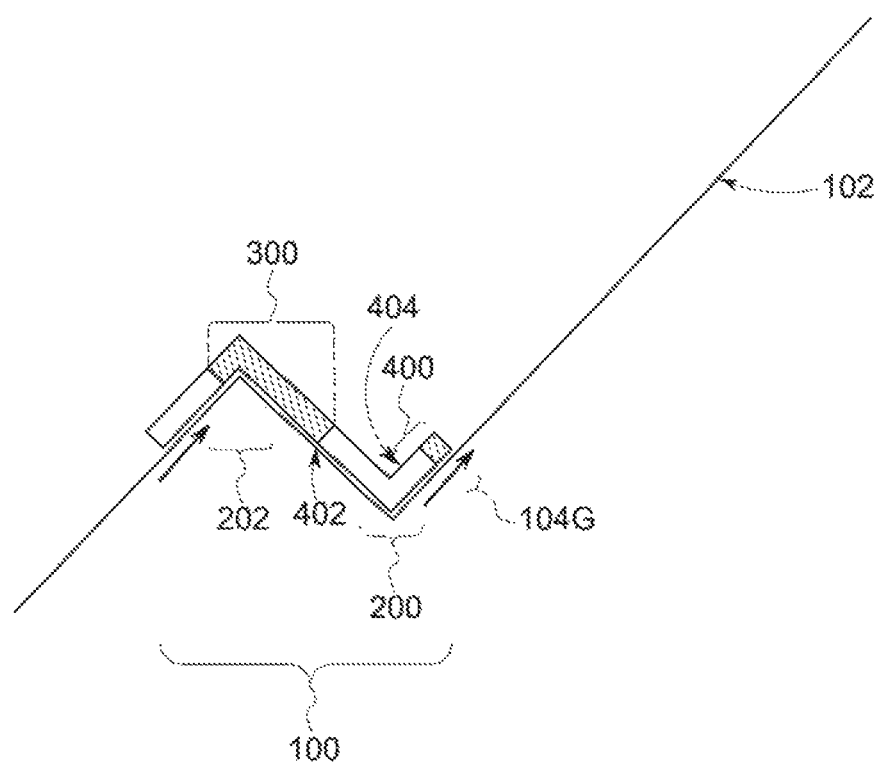
FIG. 4 schematically illustrates movement of the vehicle system along another segment of the route shown in FIG. 2.

As shown in FIG. 4, as the vehicle system 100 continues to travel over the peak 202 and the valley 200 in the route 102, the first set 300 of stretched vehicles 104 and/or 106 in the vehicle system 100 grows and a second set 400 of vehicles 104 and/or 106 in the vehicle system 100 become stretched relative to each other. The second set 400 of stretched vehicles may be created by the vehicle 104G generating dynamic braking forces to slow movement toward the valley 202. The couplers 108 between the vehicles in the stretched sets 300, 400 may be experiencing tensile (draft) forces, while the couplers 108 between the vehicles in the vehicle system 100 but outside or not included in the sets 300, 400 may be experiencing compressive (buff) forces. As a result, nodes 402, 404 are created in the vehicle system 100 between the set 300 and the vehicles 104 and/or 106 between the sets 300, 400 and between the set 400 and the vehicles 104 and/or 106 between the sets 300, 400.

Figure 5:
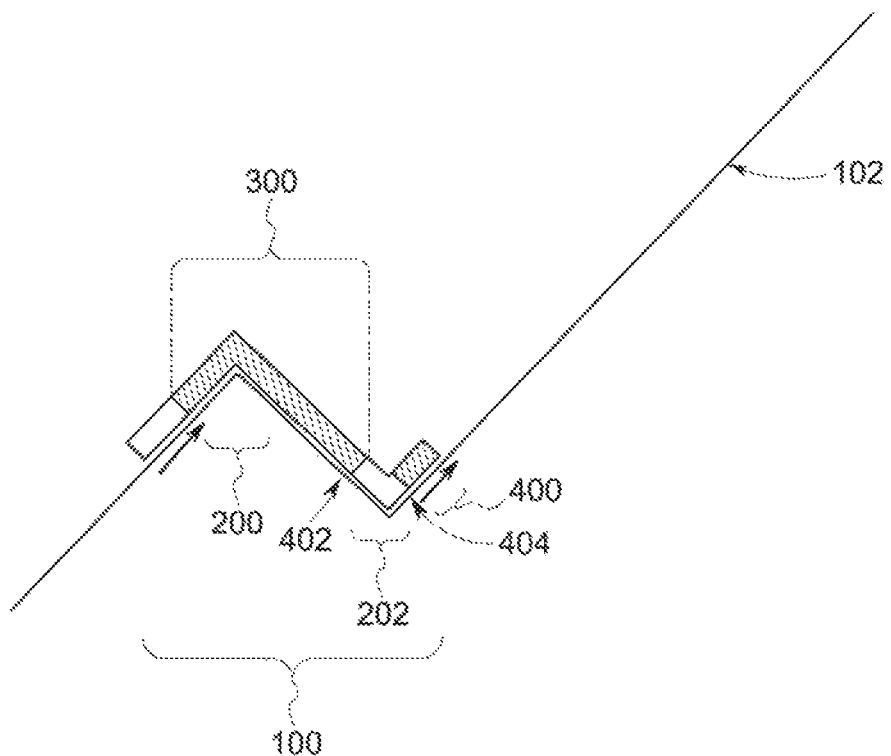
FIG. 5 schematically illustrates movement of the vehicle system along another segment of the route shown in FIG. 2.

As shown in FIG. 5, as the vehicle system 100 continues to travel over the peak 202 and the valley 200 in the route 102, the sizes of the stretched sets 300, 400 of vehicles in the vehicle system 100 continue to increase. The increasing sizes of these sets 300, 400 indicate that more couplers 108 are in tension and the nodes 402, 404 between the sets 300, 400 and the vehicles between the sets 300, 400 are moving toward each other.

Figure 6:
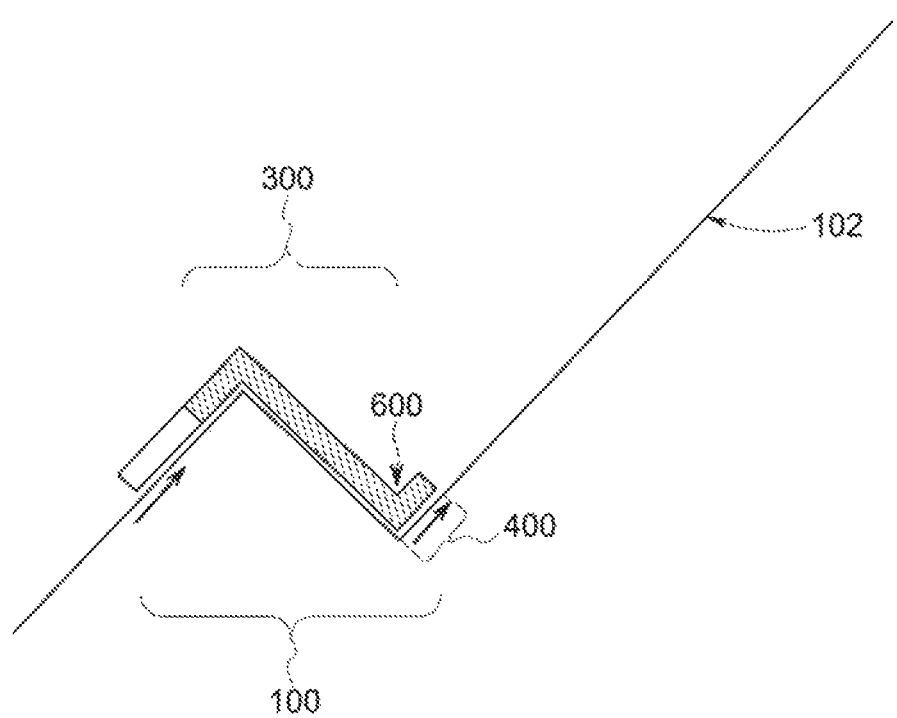
FIG. 6 schematically illustrates movement of the vehicle system along another segment of the route shown in FIG. 2.

As shown in FIG. 6, as the vehicle system 100 continues to travel over the peak 202 and the valley 200 in the route 102 and the sizes of the stretched sets 300, 400 of vehicles in the vehicle system 100 continue to increase, the nodes 402, 404 move toward each other until the nodes 402, 404 collide at a node collision location 600. This node collision location 600 represents a location where the stretched sets 300, 400 of vehicles in the vehicle system 100 collide with each other. The node collision location 600 can represent a location where vehicles in the sets 300, 400 collide with each other (anchor behavior) and potentially break one or more couplers 108 in the vehicle system 100.

The systems and methods described herein determine potential node collisions locations and determine limitations on driving parameters of the vehicles to avoid the node collisions from occurring. In one embodiment, the locations of node collisions may be determined or predicted based on one or more models of the vehicle system 100 and/or the couplers 108 in the vehicle system 100. For example, the couplers 108 between the vehicles 104, 106 can be modeled as springs having spring constants k and a damper (e.g., the mass of the vehicles 104 and/or 106 to which the modeled spring is coupled). Due to the tractive efforts (e.g., power outputs) provided by the propulsion-generating vehicles 104, the states of the vehicle system 100 may undergo a transition and the forces exerted on the couplers 108 and/or the energies stored in the couplers 108 that result from this transition at different locations along the route 102 can be calculated (e.g., estimated or simulated) as a function of the tractive efforts provided by the propulsion-generating vehicles 104 at the different locations.

By way of example only, a first coupler 108 may be expected to become compressed due to the expected deceleration of a first leading propulsion-generating vehicle 104 and the expected acceleration of a first trailing propulsion-generating vehicle 104 that are caused by changes in the grade of the route 102 during travel according to the synchronous trip plan (e.g., when traversing a valley or low point in the route 102). Another, second coupler 108 may be expected to become stretched due to the expected acceleration of a second leading propulsion-generating vehicle 104 and the expected deceleration of a second trailing propulsion-generating vehicle 104 that are caused by changes in the grade of the route 102 during travel according to the synchronous trip plan (e.g., when traversing a peak or high point in the route 102). The first coupler 108 may be estimated to have a greater compressive force than the second coupler 108 in this example.

As another example, a rigid rope model of the vehicle system 100 may be used. In such a model, the couplers 108 are treated as having no slack as the vehicle system 100 travels along the route 102. Locations where the couplers 108 are estimated to have relatively large compressive forces or relatively large tensile forces due to the tractive and/or braking efforts designated by the trip plan and due to the grades in the route 102 are not identified as nodes. Other locations where the couplers 108 are estimated to have relatively small or no compressive or tensile forces are identified as nodes. Alternatively, another model may be used and/or the locations of nodes and/or node collisions may be determined from previous trips of the vehicle system 100.

Figure 7:
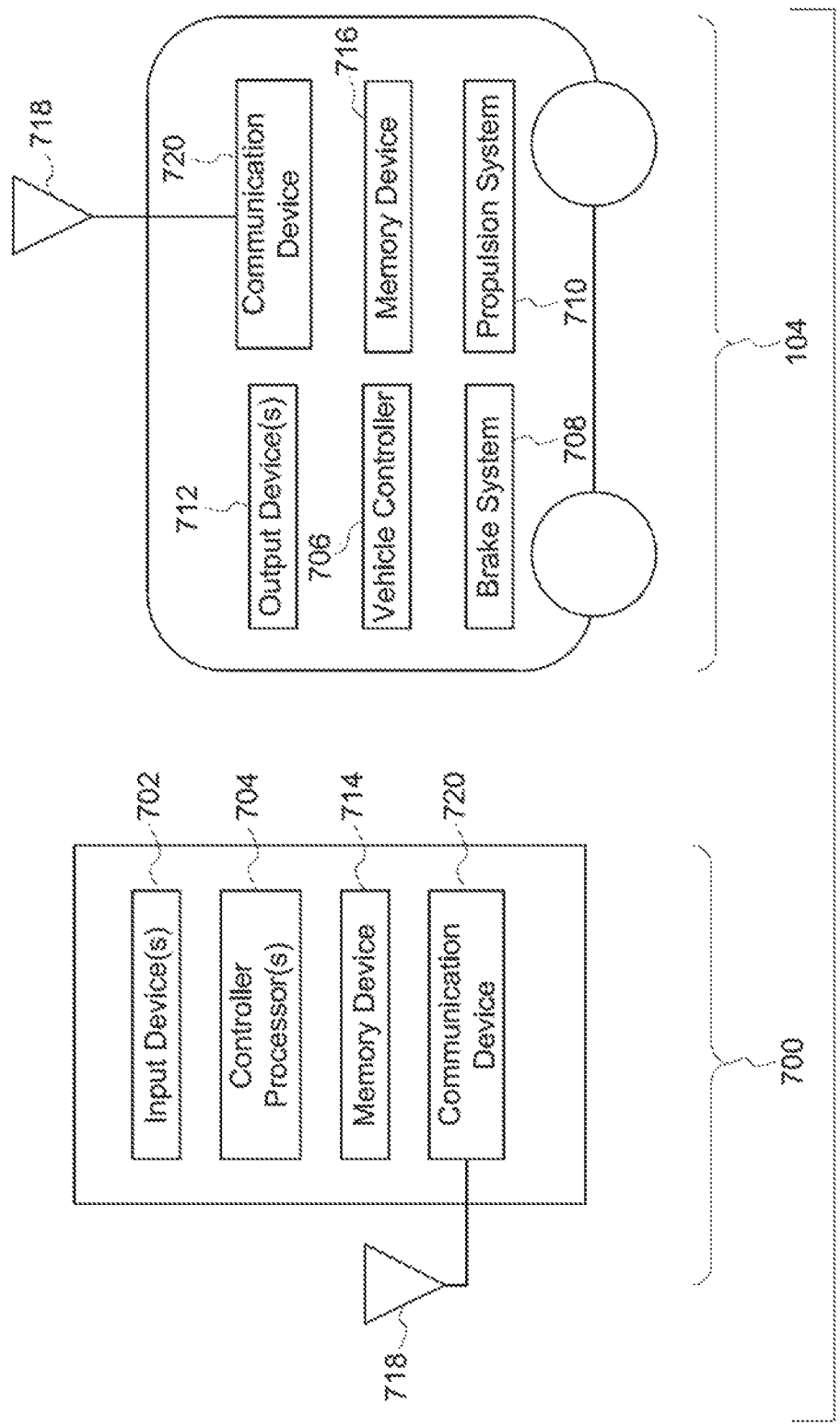
FIG. 7 illustrates one embodiment of a power control system and a propulsion-generating vehicle of the vehicle system shown in FIG. 1.

FIG. 7 illustrates one embodiment of a power control system 700 and a propulsion-generating vehicle 104 of the vehicle system 100. The power control system 700 may determine the locations of nodes in the vehicle system 100 during an upcoming trip or segment of a trip, determine whether node collisions will or are likely to occur, and/or may determine limitations on driving parameters of the vehicle system 100 to avoid node collisions. The power control system 700 may be disposed off-board the vehicle system 100 or may be partially or entirely disposed onboard the vehicle system 100.

The power control system 700 includes one or more input devices 702 that receive information used to identify potential node collisions. The input devices 702 can include wireless antenna, touchscreens, keyboards, network connections, an electronic mouse, stylus, microphone, or the like. The information that is used to identify the potential node collisions includes the types of vehicles 104, 106 in the vehicle system 100, the weights and/or lengths of the vehicles 104, 106, the braking and/or propulsive effort capabilities of the vehicles 104, 106 (e.g., how much propulsive force and/or braking force the various vehicles 104, 106 can generate), the terrain of the route 102 (e.g., curvatures, grades, etc. of the route 102), locations of the vehicles 104, 106 in the vehicle system 100, and/or other information that may be useful in determining node locations and/or node collisions.

The power control system 700 also includes one or more controller processors 704. The processors 704 represent hardware circuitry that includes and/or is connected with one or more processors (e.g., microprocessors, field programmable gate arrays, and/or integrated circuits) that are programmed to perform the operations described herein. In one embodiment, the operations described herein, whether included or not in the flowchart shown in FIG. 8, can represent software used to control the processors 704 or may be used to generate software used to control the processors 704.

A memory device 714 of the power control system 700 can represent one or more tangible and non-transitory computer readable memories, such as a computer hard drive, a CD-ROM, a DVD-ROM, a removable flash memory card, a magnetic tape, etc. The memory device 714 can be used to store information as described herein for use in determining driving parameters, trip plans, collision lines, models of the vehicle system 100, or other information.

The controller processors 704 determine where nodes will occur in the vehicle system 100 during travel for an upcoming trip or segment of a trip based on a model of the vehicle system 100 and the information received via the input devices 702 (and/or stored in the memory device 714). As described herein, the controller processors 704 can determine a trip plan that includes designated driving parameters for the vehicles 104, 106 (e.g., throttle settings and/or brake settings, as applicable, for different vehicles and designated as a function of time and/or distance along the route 102) and/or that includes restrictions on driving parameters. The designated driving parameters and/or restrictions on the driving parameters of the vehicle system 100 are created to control nodes during the trip or upcoming segment of the trip. The trip plan can be communicated to a vehicle controller 706 of the propulsion-generating vehicle 104 of the vehicle system 100. For example, the power control system 700 and the vehicle 104 may include communication devices 720, such as antennas 718 with transceiving circuitry, for communicating the trip plan from the processors 704 to the vehicle controller 706.

The controller 706 can use the trip plan to autonomously control operation of a brake system 708 and/or propulsion system 710 of the vehicle 104 shown in FIG. 7 and/or of other vehicles 104, 106 in the same vehicle system 100. For example, the controller 706 can communicate signals to other vehicles 104, 106 to control the brake systems 708 and/or propulsion systems 710 of those other vehicles 104, 106 according to the trip plan. The controller 706 represents hardware circuitry that includes and/or is connected with one or more processors that control movement of the vehicle and/or vehicle system.

A memory device 716 of the vehicle 104 can represent one or more tangible and non-transitory computer readable memories, such as a computer hard drive, a CD-ROM, a DVD-ROM, a removable flash memory card, a magnetic tape, etc. The memory device 716 can be used to store information as described herein for use in controlling the vehicle system 100, such as driving parameters, trip plans, collision lines, models of the vehicle system 100, or other information.

The propulsion systems 710 can represent engines, motors, batteries, or the like, that generate tractive effort to propel the vehicle and vehicle system. The braking systems 708 can represent brakes, such as dynamic brakes, air brakes, and/or other brakes of the vehicle and vehicle system. One or more output devices 712 of the power control system 700 communicates the trip plan to the controller 706. The output devices 712 can represent transceiving circuitry, antennas, wired connections, or the like. Optionally, one or more output devices 712 may be disposed onboard the vehicle and may instruct the operator of the vehicle how to control the vehicle system according to the trip plan. For example, an output device can include a display and/or speakers onboard the vehicle to instruct the operator how to control the vehicle system according to the trip plan.

Additionally or alternatively, the controller 706 onboard the vehicle may prevent the operator from manually controlling the vehicle system in a manner that is inconsistent with the trip plan. For example, if the operator attempts to cause a vehicle to use a throttle setting and/or brake setting that is outside of or in violation of the restrictions established by the trip plan, the controller 706 may disregard or modify the input provided by the operator so that the vehicle system is controlled within the restrictions established by the trip plan.

Figure 8:
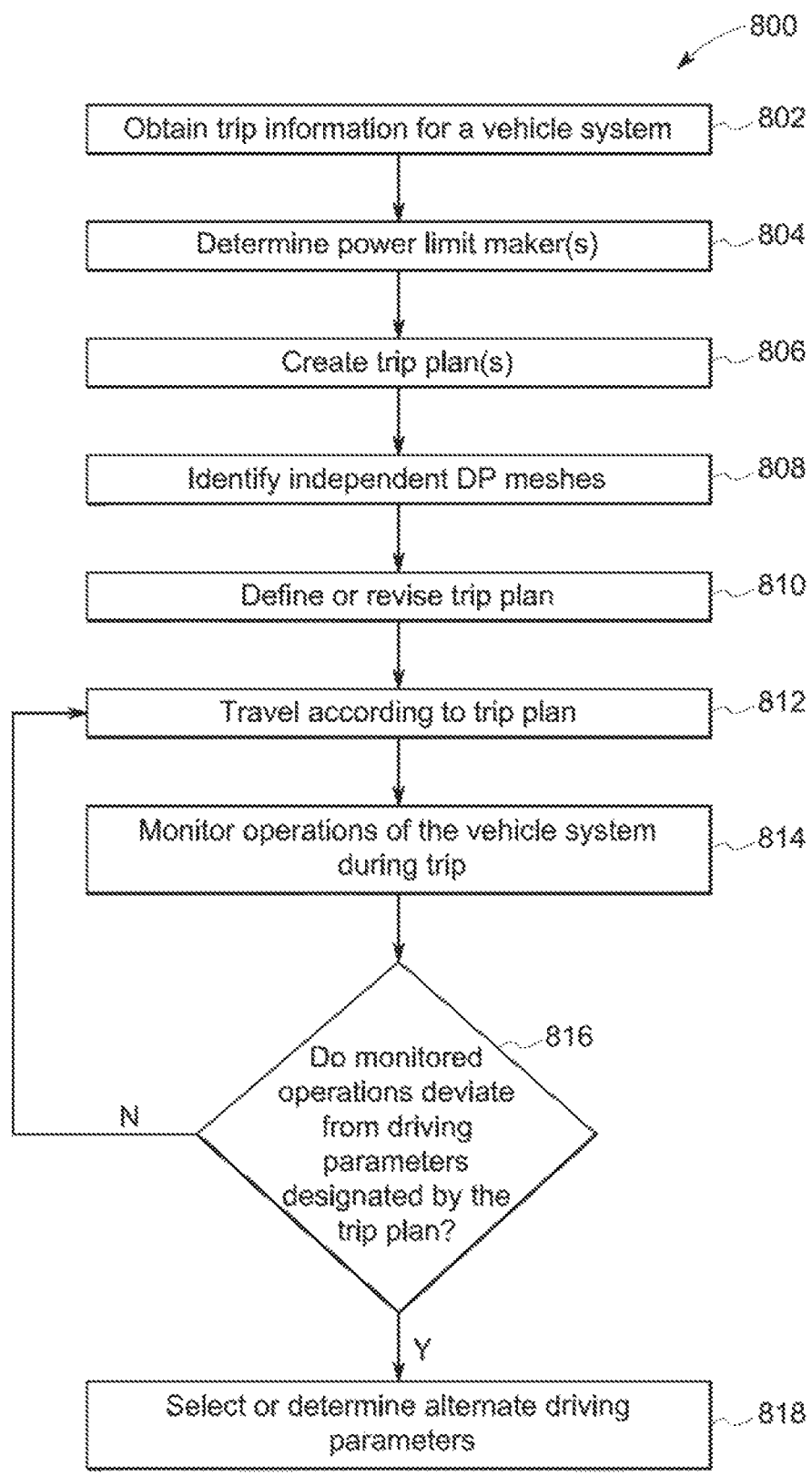
FIG. 8 illustrates a flowchart of one embodiment of a method for controlling a vehicle system.

FIG. 8 illustrates a flowchart of one embodiment of a method 800 for controlling a vehicle system. The method 800 may be used to control or limit movement of the vehicle system 100 to avoid node collisions. The method 800 may represent operations performed by the power control system 700 shown in FIG. 7. At 802, information representative of the vehicle system 100, an upcoming trip of the vehicle system 100, and/or an upcoming segment of a trip in which the vehicle system 100 is currently traveling is obtained. As described above, this information can include weights of the vehicles in the vehicle system, curvatures of the route 102, grades of the route 102, etc.

At 804, one or more restrictions on combined power settings of the vehicle system 100 are determined. These restrictions can include limitations on driving parameters such as power settings (e.g., throttle settings, brake settings, speeds, accelerations, etc.) of the vehicles in the vehicle system 100 at different locations along the route 102 in order to control nodes in the vehicle system 100. For example, restrictions on the throttle settings and/or braking settings of the vehicles in the vehicle system 100 can be determined to prevent the nodes that are predicted at 802 from colliding in the vehicle system 100. The restrictions on the combined power settings can be referred to as power limit markers. As described above, a combined power setting can represent the effective power setting of the vehicles (e.g., the propulsion-generating vehicles) in the vehicle system.

Figure 9:
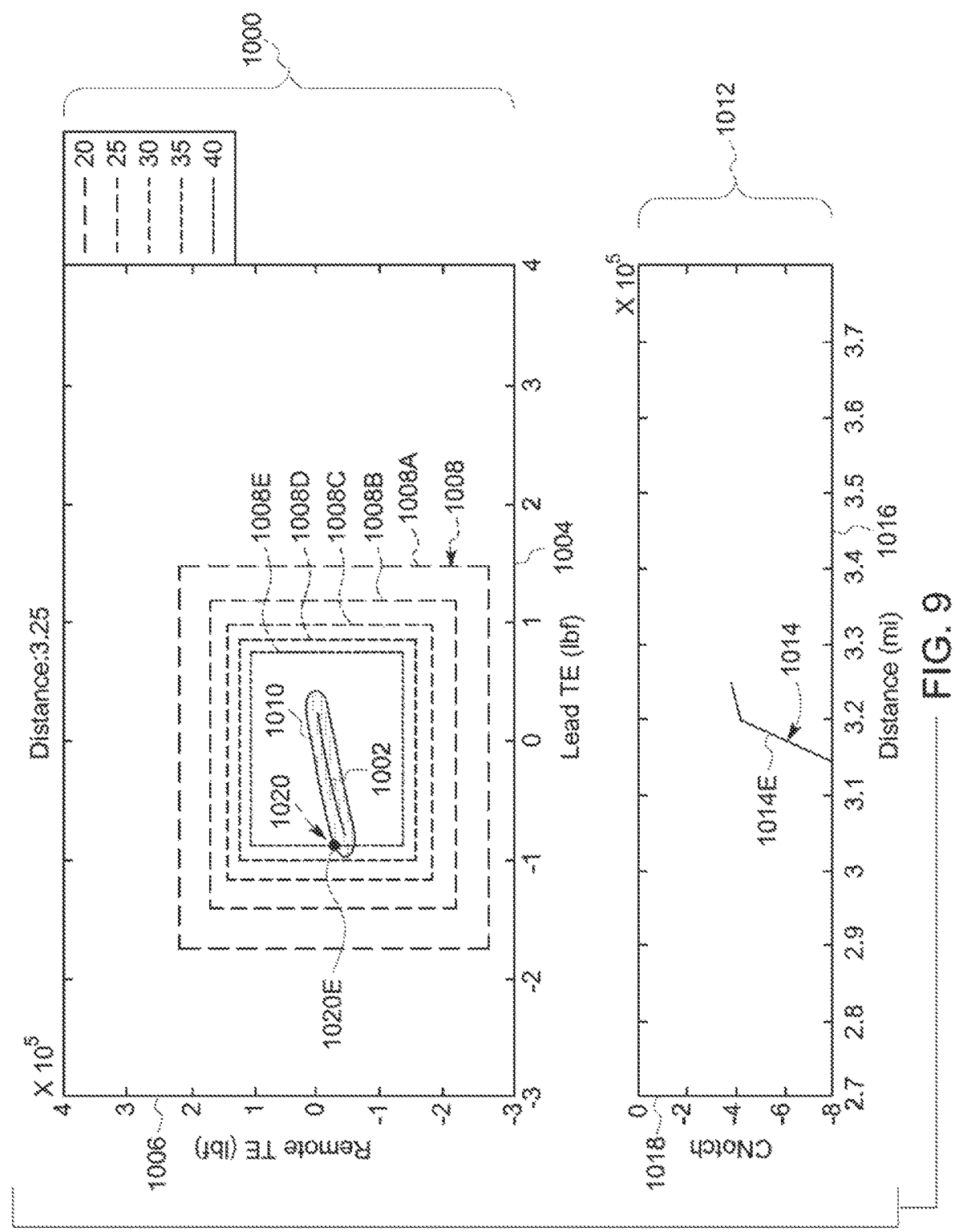
FIG. 9 illustrates an example of determining power limit markers on the combined power settings of the vehicle system shown in FIG. 1 at various locations along a route.
Figure 10:
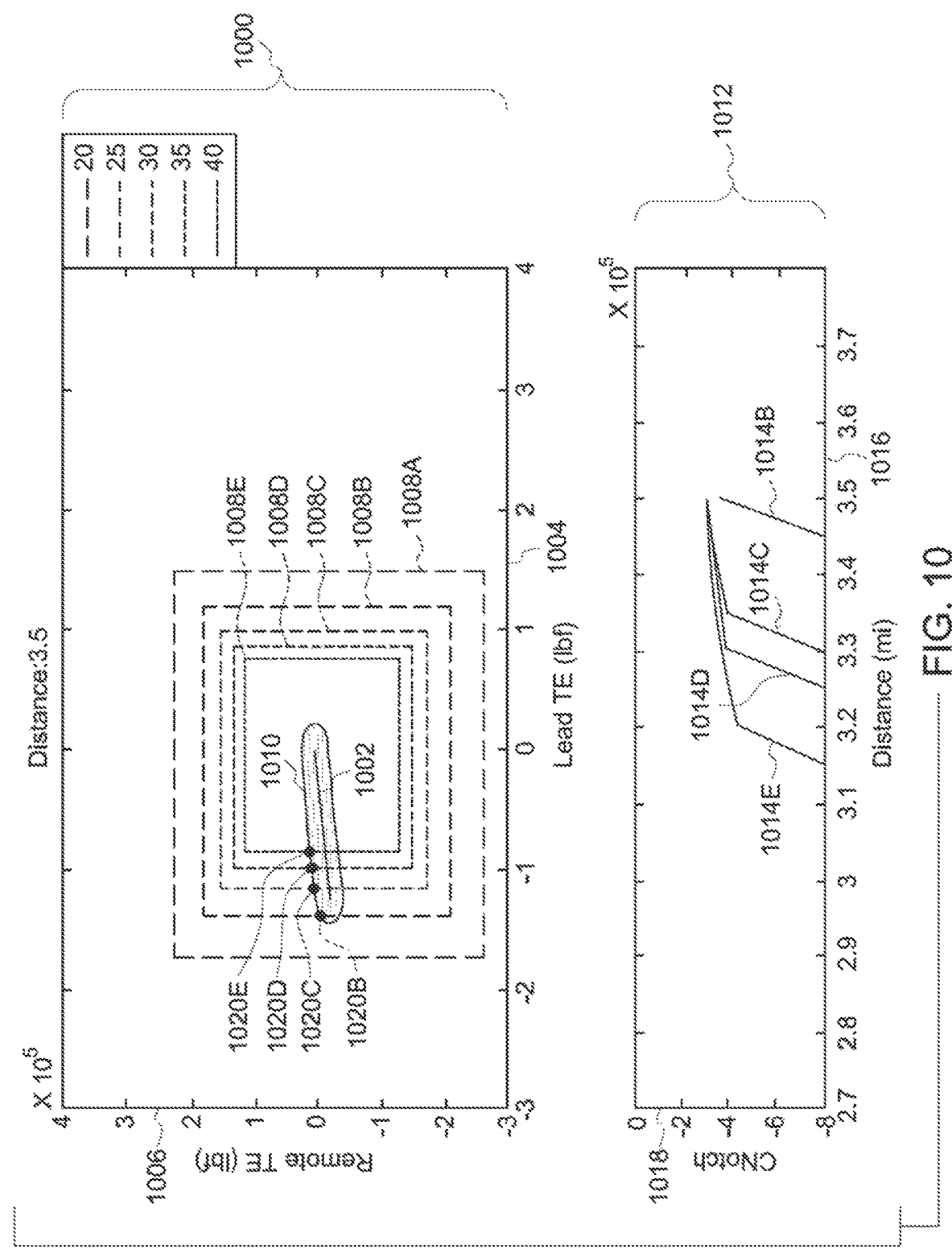
FIG. 10 illustrates another example of determining power limit markers on the combined power settings of the vehicle system shown in FIG. 1 at various locations along a route.
Figure 11:
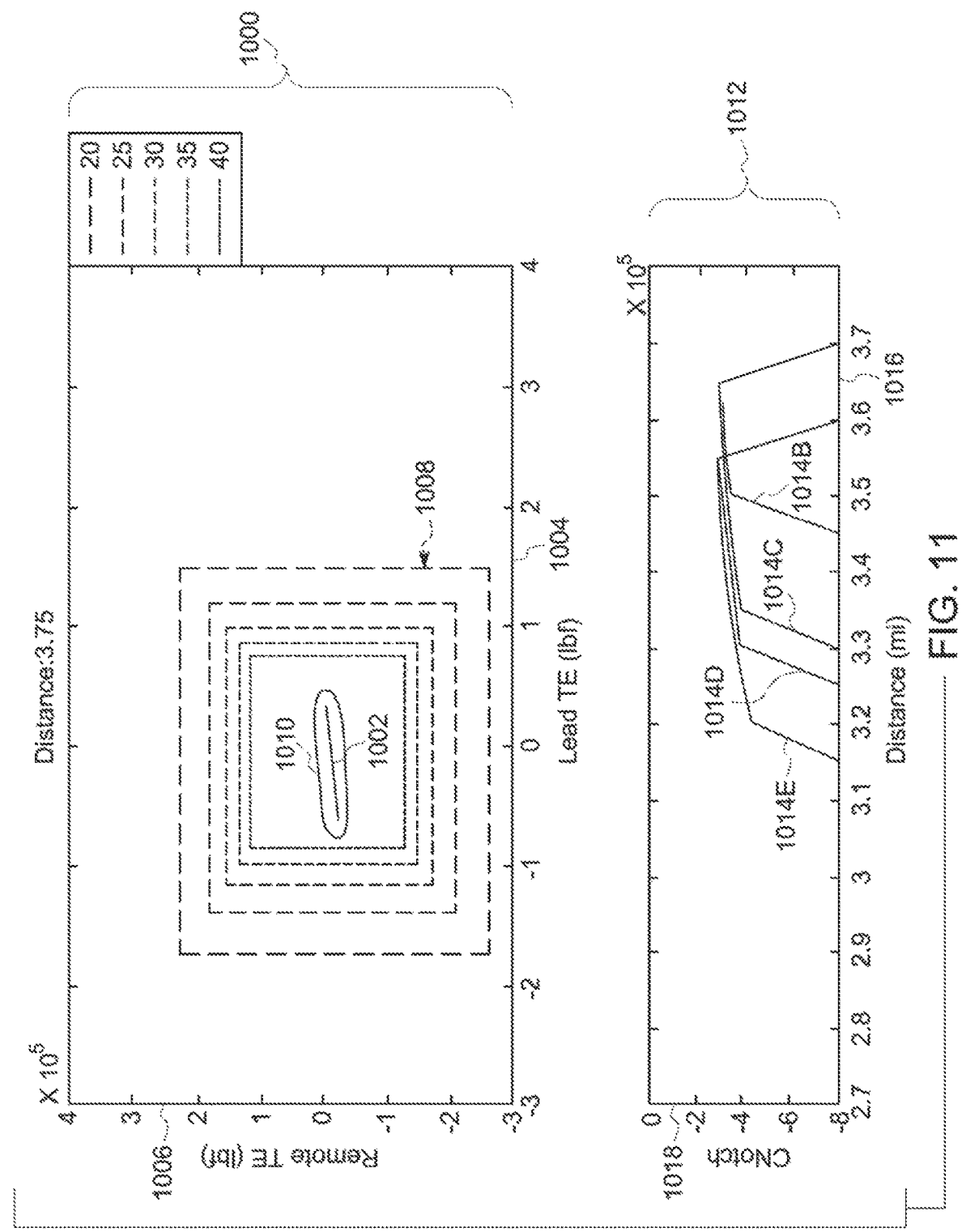
FIG. 11 illustrates another example of determining power limit markers on the combined power settings of the vehicle system shown in FIG. 1 at various locations along a route.

FIGS. 9 through 11 illustrate examples of determining power limit markers on the combined power settings of the vehicle system 100 at various locations along the route 102. In each of FIGS. 9 through 11, a first graph 1000 represents combined driving parameters 1002 (e.g., power settings) of two or more groups of vehicles 104 in the same vehicle system 100. A horizontal axis 1004 represents driving parameters of a first group of vehicles 104 and a vertical axis 1006 represents driving parameters of a different, second group of vehicles 104 in the same vehicle system 100. The first group of vehicles 104 may be ahead of the second group of vehicles 104 along a direction of travel of the vehicle system 100. Positive values of the driving parameters along the axes 1004, 1006 indicate that tractive effort is being generated, negative values of the driving parameters indicate that braking effort is being generated, and zero values indicate that the vehicles 104 are idling.

Several boxes 1008 (e.g., boxes 1008A-E) represent driving parameter limits at different designated speeds. The speeds represented by the boxes 1008 indicate different speeds at which the vehicle system 100 may travel. The box 1008A represents the vehicle system 100 traveling at 20 miles per hour (or 32 kilometers per hour), the box 1008B represents the vehicle system 100 traveling at 25 miles per hour (or 40 kilometers per hour), the box 1008C represents the vehicle system 100 traveling at 30 miles per hour (or 48 kilometers per hour), the box 1008D represents the vehicle system 100 traveling at 35 miles per hour (or 56 kilometers per hour), and the box 1008E represents the vehicle system 100 traveling at 40 miles per hour (or 64 kilometers per hour).

The line 1002 represents different combinations of driving parameters used by the first group of vehicles 104 and the driving parameter used by the second group of vehicles 104. For example, the line 1002 can represent different combinations of driving parameters that generate node collisions (e.g. stretched collisions). Therefore, combinations that should be avoided. In this example, the line 1002 should not be crossed from above the line 1002 to below the line 1002, since this transition indicates that two nodes collided. A buffer area 1010 around the combined driving parameter 1002 represents a safety margin that may optionally be used. The combined driving parameters 1002 may be determined from the model of the vehicle system.

Graphs 1012 in each of FIGS. 9 through 11 indicate power limit markers 1014 of the vehicles 104 in the sets of vehicles at different locations along the route 102. A power limit marker 1014 represents limits on the combined power settings (e.g., throttle and/or brake settings) that may be generated by the vehicles 104 in the sets of the vehicle system 100 at different locations along the route 102. As described above, the combined power settings can represent the effective throttle or brake setting of the vehicles 104 in the vehicle system 100.

The power limit markers 1014 are shown alongside a horizontal axis 1016 representative of distance along the route 102 and alongside a vertical axis 1018 representative of lower limits on the combined power settings. The power limit markers 1014 represent limits on the combined power settings of the vehicles 104 that should not be crossed in order to control nodes in the vehicle system (e.g., prevent nodes from colliding).

For example, a power limit marker with a value of negative two indicates that the effective power setting of the vehicles 104 in the vehicle system 100 should not change from negative one (or zero or a positive value) to negative three (or more negative value) in order to ensure that enough degrees of freedom will exist to control the nodes and/or avoid node collisions.

The values of the power limit markers 1014 are determined based on where intersections between the buffer area 1010 or the combined driving parameter 1002 and one or more of the boxes 1008 occur. For example, the graph 1000 shown in each of FIGS. 9 through 11 represents a different location along the route 102. An intersection 1020 between the buffer area 1010 and/or the combined driving parameter 1002 and one or more of the boxes 1008 indicates that the driving parameters of the vehicles 104 in the sets may be restricted in order to avoid nodes colliding within the vehicle system 100 between the sets of vehicles 104 if the vehicle system 100 travels at the speed represented by the corresponding box 1008. The graph 1000 in FIG. 9 represents a location that is 3.25 miles (or 5.23 kilometers) from a designated location of the trip (e.g., the beginning of the trip). At this location, the buffer area 1010 and the combined driving parameter 1002 indicate that, if the vehicle system 100 is going to travel at 40 miles per hour (or 64 kilometers per hour) at the location that is 3.25 miles (or 5.23 kilometers) from the designated location, then the buffer area 1010 intersects the box 1008E at an intersection 1020E.

This intersection 1020E indicates that there is a power limit markers 1014E on the combined power setting of the vehicles 104. This power limit markers 1014E may be determined to be a value, such as negative four in the example of FIG. 9. The power limit markers 1014 may be calculated by determining what throttle settings and/or brake settings of the first set of vehicles 104 and what throttle settings and/or brake settings of the second set of vehicles 104 may be used to avoid causing a node collision at the speed associated with the boxes 1008 and the location represented by FIG. 9.

At other speeds of the vehicle system 100, neither the buffer area 1010 nor the combined driving parameter 1002 intersects any of the other boxes 1008A-D. This indicates that there are no power limit markers 1014 on the combined power setting of the vehicles 104 in the sets when the vehicle system 100 is traveling at speeds associated with the boxes 1008A-D. The vehicle system 100 may travel at the speeds associated with the boxes 1008A-D with enough degrees of freedom to avoid node collisions within the vehicle system 100 at the location associated with FIG. 9.

With respect to FIG. 10, the graphs 1000, 1012 are associated with another location along the route 102, such as 3.5 miles (or 5.6 kilometers) from the designated location. At this location, the combined driving parameters 1002 and buffer area 1010 of the vehicle system 100 intersect the boxes 1008B-E at corresponding intersections 1020B, 1020C, 1020D, 1020E. If the vehicle system 100 is going to travel at the speed associated with the box 1008E at the location associated with FIG. 10, then the intersection 1020E indicates that the power limit marker 1014E on the combined power setting of the vehicles 104 in the sets of the vehicles 104 in the vehicle system 100 is negative three or less. Other intersections between the boxes 1008B-D and the buffer area 1010 or combined driving parameters 1002 between the locations of FIG. 9 and FIG. 10 provide additional power limit markers 1014B-D on the combined power settings. These additional power limit markers define the shape of the restrictions 1014B-D shown in the graph 1012.

If the vehicle system 100 is going to travel at the speed associated with the box 1008D at the location associated with FIG. 10, then the intersection 1020D indicates that a power limit marker 1026 on the combined power setting of the vehicles 104 in the sets of the vehicles 104 in the vehicle system 100 is negative three or less. Other intersections between the boxes 1008 and the buffer area 1010 or combined driving parameters 1002 between the locations of FIG.

9 and FIG. 10 provide additional power limit markers 1014 on the combined power setting.

Additional power limit markers 1014C, 1014B for the combined power settings of the vehicles 104 may be determined by comparing the different speeds of the vehicle system 100 (as represented by the boxes 1008) with the combined driving parameters 1002 and/or buffer area 1010 at different locations. The intersections 1020C, 1020B between these boxes 1008 and the combined driving parameters 1002 and/or buffer area 1010 dictate the power limit markers 1014C, 1014B on the combined power settings of the vehicles 104 at different locations along the route 102.

With respect to FIG. 11, the graphs 1000, 1012 are associated with another location along the route 102, such as 3.75 miles (or 6.04 kilometers) from the designated location. At this location, the combined driving parameters 1002 and buffer area 1010 of the vehicle system 100 do not intersect any of the boxes 1008. Therefore, the values of the power limit markers 1014A-E associated with the speeds of the different boxes 1008A-E are eliminated (e.g., do not appear in the graph 1012). As a result, at the location of FIG. 11, there is no power limit marker (e.g., restriction) on the combined power setting of the vehicles 104 that is needed to avoid a node collision. Alternatively, the power limit markers could be computed based on a reference speed instead of considering a range of speed values (as shown in FIGS. 9 through 11). For instance, the speed of an unrestricted trip plan of the vehicle system 100 could be used.

Figure 12:
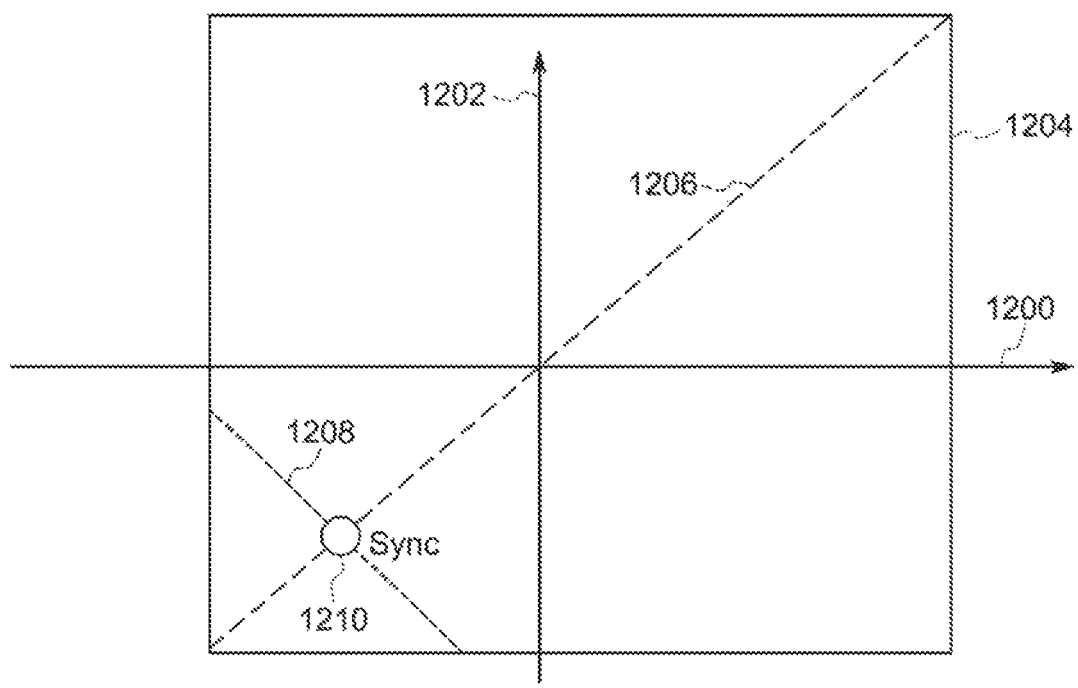
FIG. 12 illustrates how power limit markers shown in FIGS. 9 through 11 are determined according to one example.
Figure 13:
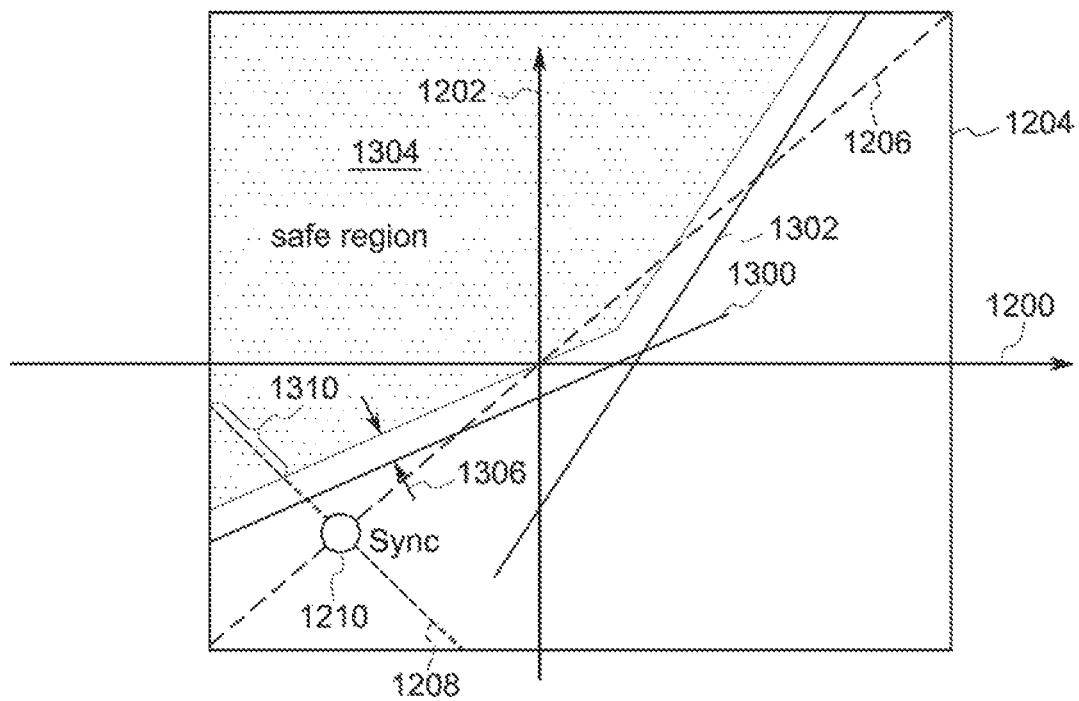
FIG. 13 illustrates how power limit markers shown in FIGS. 9 through 11 are determined according to another example.
Figure 14:
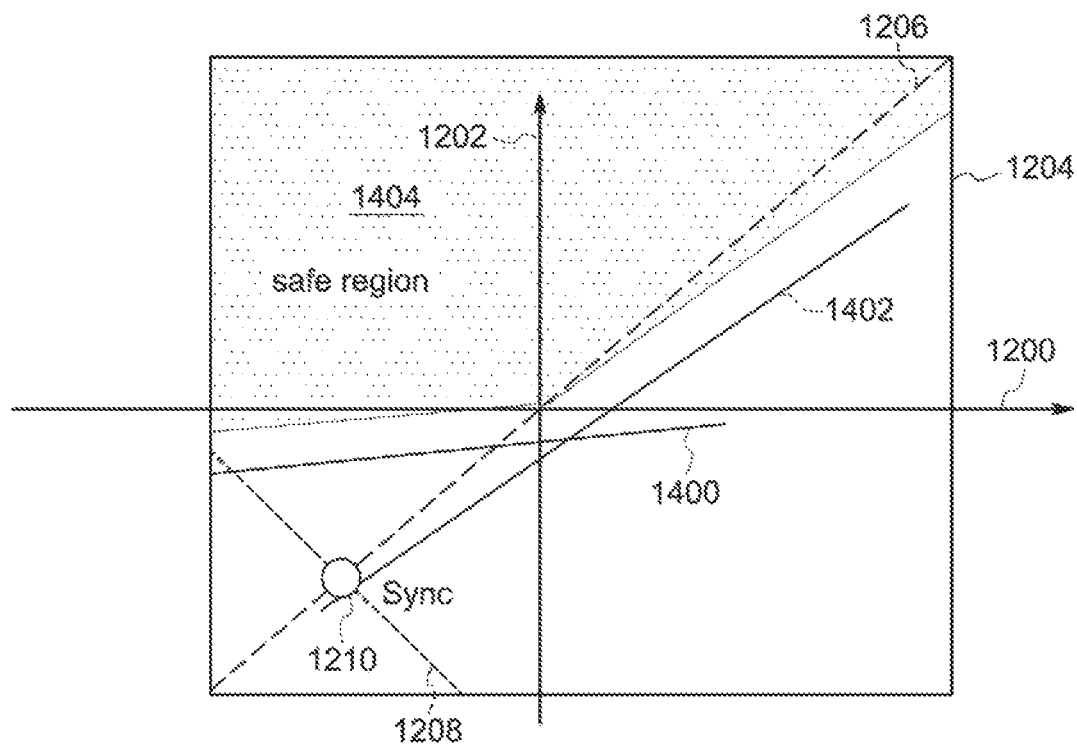
FIG. 14 illustrates how power limit markers shown in FIGS. 9 through 11 are determined according to another example.

FIGS. 12 through 14 illustrate how power limit markers 1014 shown in FIGS. 9 through 11 are determined according to some examples. These figures include a horizontal axis 1200 representative of different driving parameters of the vehicles 104 in the vehicle system 100 in a first set, consist, or group of the vehicles 104. A vertical axis 1202 represents different driving parameters of the vehicles 104 in the vehicle system 100 in a different, set, consist, or group of the vehicles 104. The first set of vehicles 104 may be ahead of the second set of vehicles 104 along a direction of movement of the vehicle system 100. The driving parameters can represent the throttle settings or brake settings used by the vehicles 104 in each of the sets. For example, a driving parameter of +X along the horizontal axis 1200 indicates that the vehicles 104 in the first set are propelling themselves and the vehicle system 100 with a throttle setting of X, while a driving parameter of −X along the horizontal axis 1200 indicates that the vehicles 104 in the first set are braking with a brake setting of X. A driving parameter of +Y along the vertical axis 1202 indicates that the vehicles 104 in the second set are propelling themselves and the vehicle system 100 with a throttle setting of Y, while a driving parameter of −Y along the vertical axis 1202 indicates that the vehicles 104 in the second set are braking with a brake setting of Y.

Driving parameters limitations 1204 are illustrated in FIGS. 12 through 14 as a box, but alternatively may have another shape. The limitations 1204 restrict how large of a throttle setting (along the positive directions of the axes 1200, 1202) that the vehicles 104 in the first and second sets may use and how large of a brake setting (along the negative directions of the axes 1200, 1202) that the vehicles 104 in the first and second sets may use. Each of FIGS. 12 through 14 illustrates how power limit markers are determined for a different location along the route 102 and/or for different speeds of the vehicle system 100. For example, FIG. 12 illustrates how a power limit marker can be determined for a first location along the route 102 and/or a first speed of the vehicle system 100 at the first location, FIG. 13 illustrates how a power limit marker can be determined for a different, second location along the route 102 and/or a different, second speed of the vehicle system 100 at the first location or at another location, and FIG. 14 illustrates how a power limit marker can be determined for a different, third location along the route 102 and/or a different, third speed of the vehicle system 100 at the first location or at another location.

A synchronous driving parameter relationship 1206 represents common driving parameters that may be used for the vehicles 104 in the first and second sets in the vehicle system 100. During movement of the vehicle system 100, a certain amount of propulsive force may be needed to cause the vehicle system 100 to move at a designated speed or a certain amount of braking force may be needed to slow the vehicle system 100 to a designated speed. The amount of propulsive or braking force may be determined from models of the vehicle system 100, from simulation of travel of the vehicle system 100, and/or from previous trips of the vehicle system 100.

The amount of propulsive force or braking force needed for the vehicle system 100 may represent one or more locations along the synchronous relationship 1206. For example, at various locations along the synchronous relationship 1206, the vehicles 104 in the first and second sets of the vehicle system 100 are using the same throttle setting or brake setting to provide different total amounts of propulsive force or braking force for the vehicle system 100. Once the amount of propulsive force and/or braking force is determined, a location 1210 along the synchronous relationship 1206 can be identified. The location 1210 represents a total power output of the propulsion-generating vehicles 104 in the vehicle system 100 (or in different, non-overlapping sets of the vehicles 104 that may be on opposite sides of a node being controlled).

Once the location 1210 along the synchronous relationship 1206 is determined, the total power output represented by the location 1210 can be distributed among the vehicles 104, such as by determining individual throttle or brake settings of the vehicles 104 in different sets of the vehicle system 100. In order to distribute the total power output, an independent driving parameter relationship 1208 may be examined to determine if there are any degrees of freedom for changing the driving parameters of the different vehicles 104. The independent relationship 1208 represents asynchronous driving parameters that may be used for the vehicles 104 in the first and second sets in the vehicle system 100. At various locations along the independent relationship 1208, the vehicles 104 in the first or leading set of vehicles 104 in the vehicle system 100 use different throttle or brake settings than the vehicles 104 in the second or trailing set of vehicles 104 in the vehicle system 100. After the location 1210 along the synchronous relationship 1206 is identified, a location along the independent relationship 1208 may be selected to define the driving parameters of the vehicles 104 in the leading set and the driving parameters of the vehicles 104 in the trailing set. The independent relationship 1208 may be oriented at ninety degrees with respect to the synchronous relationship 1206. Alternatively, the independent relationship 1208 may be at another orientation with respect to the synchronous relationship 1206.

In operation, the model of the vehicle system 100, simulation of travel, or examination of previous travel of the vehicle system 100 along the route 102 can be used to identify locations along the route 102 where certain combinations of driving parameters used by the vehicles 104 in the leading and trailing sets cause node collisions to occur. These locations may be identified by modelling or simulating movement of the vehicle system 100 at different designated speeds at various locations along the route 102 to determine the driving parameters needed to travel at the designated speeds. The model or simulation also reveals where nodes are located, where nodes move, and where node collisions will or are likely (e.g., more likely than not) to occur.

In the location along the route 102 represented by FIG. 12, there are no restrictions on the synchronous or independent driving parameters that may be used by the vehicles 104. The location associated with FIG. 12 does not pose any risk or any significant risk (e.g., a risk greater than 3%, greater than 5%, or greater than 10%) of a node collision regardless of the driving parameters used by the vehicles 104. Therefore, there is no power limit marker defined for the location associated with FIG. 12, similar to there being no power limit markers defined for locations from 2.7 miles to 3.15 miles (or 4.4 kilometers to 5.07 kilometers) for the vehicle system 100 traveling at any of the designated speeds shown in the examples of FIGS. 9 through 11.

With respect to the location along the route 102 associated with FIG. 13, however, there are risks of node collisions for various combinations of driving parameters. The processors of the power control system 700 can identify the driving parameter combinations that create a risk of node collisions based on models of the vehicle system 100, simulation of travel of the vehicle system 100, and/or based on previous trips of the vehicle system 100.

Collision lines 1300, 1302 represent thresholds that cannot be crossed by changing the driving parameters of the vehicles 104 in the first and second sets. For example, the changing the synchronous driving parameters along the relationship 1206 and/or changing the independent driving parameters along the relationship 1208 to cause the driving parameters to cross either collision line 1300, 1302 will cause or is likely to cause a node collision at the location associated with FIG. 13. While the collision lines 1300, 1302 are shown as straight lines, one or more of the collision lines 1300, 1302 may have a non-linear shape, such as an undulating shape, a parabolic shape, another curved shape, or another shape.

Based on the size, orientation, and location of the collision lines 1300, 1302, the processors of the power control system 700 can determine a safe region 1304. The safe region 1304 represents the combinations of driving parameters that may be used by the vehicles 104 in the first and second sets in the vehicle system 100 to avoid causing a node collision between the first and second sets of the vehicles 104. The safe region 1304 may be identified or defined as ranges of combinations of driving parameters bounded by the limits 1204 on the driving parameters and separated from the collision lines 1300, 1302 by a buffer distance 1306, as shown in FIG. 13. The buffer distance may be a percentage or fraction of the total range of driving parameters encompassed by the limits 1204, such as 3%, 5%, or 10%. Alternatively, the safe region 1304 may extend to, but not include, the collision lines 1300, 1302.

Based on the safe region 1304, the processors of the power control system 700 can identify allowable ranges of driving parameters for the vehicles 104 in the first and second sets. For example, the power control system 700 may determine that the braking force required to control movement of the vehicle system 100 to a designated speed at the location associated with FIG. 13 is provided by the synchronous driving parameters defined at the location 1210 along synchronous relationship 1206.

The location 1210 along the synchronous relationship 1206 defines where the independent relationship 1208 intersects the synchronous relationship 126. Because the collision line 1300 crosses the independent relationship 1208 shown in FIG. 13, not all driving parameters defined along the independent relationship 1208 may be used by the vehicles 104 in the leading and trailing sets. For example, a range 1310 of the independent relationship 1208 that is disposed inside the safe region 1304 represents the driving parameters that may be used by the vehicles 104 in the leading and trailing sets to control one or more nodes. The allowable range 1310 of driving parameters can be bounded by upper and lower power limits on one or more of the vehicles 104, such as a lower power limit on the brake setting and an upper power limit on the throttle setting of the one or more vehicles 104.

The driving parameters falling within the range 1310 define the power limit marker for the location along the route 102 of the trip represented by the safe region 1304 shown in FIG. 13. The value of the power limit marker shown in the graphs 1012 may be large enough to encompass the range 1310 of the driving parameters, but not larger such that the power limit marker includes driving parameters that are outside of the range 1310. For example, if the value of the driving parameters at the intersection of the independent relationship 1208 and the safe region 1310 (e.g., the right most end to the range 1310 in FIG. 13), represents a driving parameter of negative five for the vehicles 104 in the leading set and a driving parameter of negative three for the vehicles 104 in the trailing set, then the power limit marker may be a sum of these driving parameters, such as negative eight, for the location represented by FIG. 13.

FIG. 14 illustrates a safe region 1404 and collision lines 1400, 1402 for another location along the route 102 and/or for another speed of the vehicle system 100. The location 1210 represents a total power output of the propulsion-generating vehicles 104 in the vehicle system 100 (or in different, non-overlapping sets of the vehicles 104 that may be on opposite sides of a node being controlled). In one example, the total power output can be represented by the driving parameters needed to provide sufficient braking force (or propulsive force) to move the vehicle system 100 at a designated speed at the location along the route 102 represented by FIG. 13.

As shown in FIG. 13, the safe region 1404 is too small to intersect the independent relationship 1208 that intersects the synchronous relationship 1206 at the location 1210. Therefore, there are no values of the driving parameters along the independent relationship 1208 that can be used by the vehicles 104 in the leading and trailing sets of the vehicle system 100 to avoid a node collision at the route location and speed represented by FIG. 13. A power limit marker of zero (or another value) may be defined for this route location and speed, as there are no combinations of the driving parameters that can both provide sufficient propulsive force or braking force to move the vehicle system 100 at the designated speed and avoid node collisions.

Several power limit markers may be defined based on the range 1310 of allowable driving parameters for different route locations and speeds. The power limit markers represent the restrictions on combined tractive efforts of the vehicle system 100 that are determined. Returning to the description of the flowchart of the method 800 shown in FIG. 8, at 806, one or more trip plans are created using the restrictions on the combined tractive efforts of the vehicle system 100. The trip plans may be created by designating the speeds of the vehicle system 100 at different locations along the route 102, with the speeds achieved by the vehicles 104 in the leading and trailing sets in the vehicle system 100 provided by the vehicles 104 operating using driving parameters within the ranges 1310 of the power limit markers at the various route locations.

At 808, the restrictions on the combined tractive efforts of the vehicles 104 in the vehicle system 100 are examined to identify viable independent distributed power (DP) meshes. A viable independent DP mesh represents one or more combinations of driving parameters that may be used by different vehicles 104 in the leading set and/or in the trailing set to provide the combined tractive efforts within the restrictions defined by the power limit markers. The driving parameters within an allowable range (e.g., the range 1310) of a power limit marker include various combinations of throttle and/or brake settings for the vehicles 104 in the leading and trailing sets of the vehicle system 100.

For example, one location along the allowable range 1310 may represent a driving parameter of negative six (e.g., applying the brakes at a setting of six out of eight) for the vehicles 104 in the leading set of the vehicle system 100 and a driving parameter of negative three (e.g., applying the brakes at a setting of three out of eight) for the vehicles 104 in the trailing set of the vehicle system 100. Another location along the same allowable range 1310 may represent a driving parameter of negative seven (e.g., applying the brakes at a setting of seven out of eight) for the vehicles 104 in the leading set of the vehicle system 100 and a driving parameter of negative two (e.g., applying the brakes at a setting of two out of eight) for the vehicles 104 in the trailing set of the vehicle system 100. Other locations within the same allowable range 1310 may represent other combinations of driving parameters, or combined driving parameters.

In one embodiment, the processors of the power control system 700 can examine the driving parameters within the range of allowable driving parameters defined by the power limit markers and select the driving parameters for different route locations based on how far the driving parameters are from the collision lines. For example, if five different driving parameters are within the range of allowable driving parameters defined by a power limit marker for a first location along the route, then the power control system 700 may select the driving parameter of the five that is farther from the collision line associated with the first location along the route than one or more, or all, of the driving parameters within the allowable range. Alternatively, the power control system 700 may select the driving parameter of the range of allowable driving parameters that is closer to the collision line than one or more, or all, of the driving parameters within the allowable range. In one example, the power control system 700 may select driving parameters that are outside the buffer area around the collision lines.

Optionally, the processors of the power control system 700 can examine one or more handling parameters of the vehicle system 100 to determine which of the combined driving parameters within the allowable ranges defined by the power limit markers to use in the trip plan for the vehicle system 100. A handling parameter may include a measurement of control of the vehicle system 100. In one embodiment, the power control system 700 may select the combined driving parameters in order to reduce or minimize the handling parameters. By "minimize" (and forms thereof) it is meant that the value of a handling parameter is reduced relative to a handling parameter that would occur if another combined driving parameter (e.g., a combined driving parameter that exceeds the power limit marker or that is otherwise not within the allowable range of driving parameters defined by the power limit marker). "Minimizing" (and forms thereof) also can mean reducing the value of a handling parameter to at least a designated limit, but not necessarily the smallest possible value.

Examples of handling parameters include forces exerted on one or more couplers 108 in the vehicle system 100, momentum, and throttle changes. The forces exerted on couplers (e.g., coupler forces) may be measured by force sensors coupled to the couplers 108 or by distance sensors (e.g., radar, lidar, etc.). Additionally or alternatively, the coupler forces may be determined from a previous trip of the vehicle system 100 (e.g., based on previous measurements). Optionally, the coupler forces may be determined using route data that is representative of the route 102 (e.g., curvature and/or grade) and/or vehicle data that is representative of the size (e.g., mass) of the vehicle system 100 and/or a segment of the vehicle system 100:

$$F_{i-1} - F_i = m_i g_i + m_i \dot{v} \qquad \text{(Equation \#1)}$$

where $F_i$ represents the natural force exerted on the $i^{th}$ coupler 108 in the vehicle system 100, represents the natural force exerted on the $(i-1)^{th}$ coupler 108 in the vehicle system 100, $m_i$ represents the mass of the $i^{th}$ vehicle 104 or 106, g represents the mean, average, or effective grade of the route 102 beneath the vehicle system 100, and $\dot{v}$ represents the acceleration of the vehicle system 100. The acceleration ($\dot{v}$) may be the acceleration that is caused by gravitational force and can be represented as:

$$\dot{v} = \frac{\sum_{i=1}^{N} m_i g_i}{\sum_{i=1}^{N} m_i} \qquad \text{(Equation \#2)}$$

As a result, the natural force exerted on the $i^{th}$ coupler 108 may be defined as:

$$F_i = \sum_{j=1}^{i} m_j g_j + m_j \dot{v} \qquad \text{(Equation \#3)}$$

If the force is positive at a coupler 108 (e.g., greater than zero), the force can indicate that gravity tends to stretch the coupler 108. Conversely, if the force is negative at the coupler 108 (e.g., less than zero), the force can indicate that gravity tends to compress the coupler 108. The power control system may select the combined driving parameters for various locations along the route 102 to reduce the coupler forces, to eliminate or change the locations of nodes in the vehicle system 100, or otherwise control the forces exerted on the couplers 108.

For example, the processors of the power control system 700 may select the combined driving parameter at a location along the route 102 that reduces the total forces exerted on the couplers 108 (e.g., relative to a previous location) or that minimizes the total forces exerted on the couplers 108. The total forces ($F_T$) exerted on the couplers 108 may be determined from:

$$F_T = \sum_{j=1}^{i} F_i^2 \qquad \text{(Equation \#4)}$$

Alternatively, the total forces exerted on the couplers 108 may be determined by calculating square root of a sum of squares of the force exerted on each of the couplers 108 (or a subset of the couplers 108) in the vehicle system 100.

With respect to momentum being used as a handling parameter, the power control system can select the combined driving parameter at a location and speed of the vehicle system 100 that will result or direct the vehicle system 100 and/or one or more vehicles 104, 106 to slow down (relative to a previous speed) so that the momentum of the vehicle system 100 and/or one or more groups of vehicles 104, 106 decreases (relative to a previous momentum). Alternatively, the power control system may select the combined driving parameter that causes or directs the vehicle system 100 to increase the momentum of one or more sets of the vehicles 104, 106 to increase to a designated momentum, such as the momentum of another set of the vehicles 104, 106 in the same vehicle system 100, to within a designated range of the momentum of the other set of the vehicles 104, 106 (e.g., within 1%, 3%, 5%, 10%, or another range), or another value. Selecting the combined driving parameters to control the momentum of different vehicles 104, 106 or vehicle sets in the same vehicle system 100 to be the same or within a designated range of each other can reduce the forces exerted on couplers 108 between the vehicles 104, 106 and/or can eliminate or reduce nodes in the vehicle system, and thereby improve handling parameters of the vehicle system.

With respect to throttle changes being used as a handling parameter, the processors of the power control system 700 can select the combined driving parameter that avoids a change in throttle or brake setting. If the driving parameters for the vehicles 104 can be set for a location to avoid having to change the throttle or brake setting from a previous or currently used setting, then the power control system 700 may select the driving parameters that avoids a change in setting. For example, if the power control system 700 determines that the vehicles 104 in the leading, trailing, or other set of vehicles 104 in the vehicle system 100 are to use a throttle setting of four at a first location along the route 102 and the power limit marker restricts the throttle setting to a value of three, four, five, or six at a second, subsequent location along the route 102, then the power control system 700 may dictate that the vehicles 104 use the throttle setting of four at the second location to reduce or eliminate the number of throttle setting changes in the trip plan. As another example, the power control system 700 may select the throttle or brake setting that is closer to a previous throttle or brake setting. If the power control system 700 determines that the vehicles 104 in the leading, trailing, or other set of vehicles 104 in the vehicle system 100 are to use a brake setting of two at a third location along the route 102 and the power limit marker restricts the brake setting to a value of five, six, or seven at a fourth, subsequent location along the route 102, then the power control system 700 may dictate that the vehicles 104 use the brake setting of five at the fourth location to reduce the degree of change in the brake setting between the locations.

Returning to the description of the flowchart of the method 800, throttle and/or brake settings that are selected from within the allowable ranges defined by the power limit markers as the viable independent DP meshes at 808. In one example, a single driving parameter may be selected for each location (e.g., each mile or kilometer along the route, or each of a series of miles or kilometers along the route) along the route 102. Optionally, several driving parameters may be selected for each location. For example, instead of selecting a single driving parameters, two or more, or all, driving parameters within the allowable range dictated by the power limit marker, may be selected for inclusion in the trip plan for the location associated with the power limit marker. Designating several driving parameters for a location can allow for the vehicle system 100 or operator of the vehicle system 100 to use a variety of driving parameters at one or more locations along the route 102.

At 810, a trip plan is defined or revised for an upcoming trip or an upcoming segment of the trip based on or using the driving parameters (e.g., throttle and/or brake settings) selected based on the allowable parameters defined by the power limit markers at different route locations. The vehicle system may then move along the route 102 using the trip plan, such as by using the throttle and/or brake settings designated for the different route locations based on the power limit markers.

At 812, the vehicle system moves along the route 102 for the trip or a portion of the trip using the driving parameters defined by the trip plan. The vehicle system 100 may be automatically controlled according to the trip plan by the controller 706 controlling the propulsion and brake systems 710, 708 of the vehicle system 100 according to the driving parameters defined by the trip plan. Optionally, the controller may direct the output device 712 to present instructions to a human operator of the vehicle system 100 that direct the operator how to control the propulsion and brake systems 710, 708 according to the trip plan.

At 814, operations of the vehicle system 100 are monitored during movement according to the driving parameters designated by the trip plan in order to identify deviations or other differences between operation of the vehicle system 100 and the trip plan. During movement of the vehicle system 100, one or more factors may cause the throttle settings or brake settings used by the vehicle system 100 during movement to deviate from the driving parameters dictated by the trip plan.

For example, headwinds (i.e., wind flowing in a direction that is opposite or otherwise against the direction of travel of the vehicle system 100) may result in the controller 706 or the operator to use larger throttle settings (e.g., settings that cause the propulsion system 710 to generate more tractive effort or force than smaller throttle settings) and/or smaller brake settings (e.g., settings that cause the braking system 708 to generate less braking effort or force than larger brake settings) than designated by the trip plan. Alternatively, tailwinds (i.e., wind flowing in a direction that is the same as or otherwise not against the direction of travel of the vehicle system 100) may result in the controller 706 or the operator to use smaller throttle settings and/or larger brake settings than designated by the trip plan.

As another example, differences in friction or adhesion between the wheels of the vehicle system 100 and the friction or adhesion on which the trip plan is based may result in the controller 706 or the operator using different throttle settings and/or brake settings than designated by the trip plan.

In another example, differences in weight of the vehicles 104 and/or 106, differences in locations of vehicles 104 and/or 106 in the vehicle system 100, or other differences between the vehicle system 100 and/or external conditions in which the vehicle system 100 is traveling and the details of the vehicle system 100 and/or external conditions on which the trip plan is based may result in the controller 706 and/or operator using driving parameters other than those designated by the trip plan in one or more locations along the route 102.

The driving parameters that are used to control movement of the vehicle system 100 that are different from the driving parameters designated by the trip plan may be referred to as deviating driving parameters while the driving parameters dictated by the trip plan may be referred to as designated driving parameters. The operations of the vehicle system 100 may be monitored by the controller 706, such as by the controller 706 examining the position of the throttle setting and/or brake setting.

At 816, the monitored operations of the vehicle system 100 are compared to the driving parameters designated by the trip plan to determine whether the operations deviate from the trip plan. If the monitored operations (e.g., throttle and/or brake settings) are different from the designated driving parameters, then the controller 706 may determine that the designated driving parameters may need to be altered to keep the vehicle system 100 moving according to the trip plan or to return the vehicle system 100 to moving according to the trip plan. For example, the controller 706 may determine that the throttle settings need to be increased or the brake settings need to be decreased to accelerate the vehicle system 100 back to the designated parameters of the trip plan or that the throttle settings need to be decreased or the brake settings need to be increased to decelerate the vehicle system 100 back to the designated parameters of the trip plan.

If the controller 706 determines that the monitored operations differ from the trip plan, then flow of the method 800 can proceed toward 818 in order to alter movement of the vehicle system 100. On the other hand, if the controller 706 determines that the monitored operations do not differ from the trip plan (e.g., the monitored operations are within a designated threshold, such as 10%, one notch position, or the like, of the designated parameter of the trip plan), then flow of the method 800 can return toward 812 so that the vehicle system 100 can continue moving according to the trip plan with the operations being monitored for deviations from the trip plan. Optionally, the method 800 may terminate, such as when the trip is completed.

At 818, one or more alternate driving parameters are selected to return the vehicle system 100 to traveling according to the trip plan while avoiding a node collision within the vehicle system 100. As described above, the power control system 700 can determine collision lines that designate the driving parameters that are likely to result in node collisions within the vehicle system 100. The collision lines may be communicated from the power control system 700 to the vehicle controller 706 so that the controller 706 can determine what driving parameters to use in order to return the vehicle system 100 to traveling according to the trip plan while avoiding node collisions.

Figure 15:
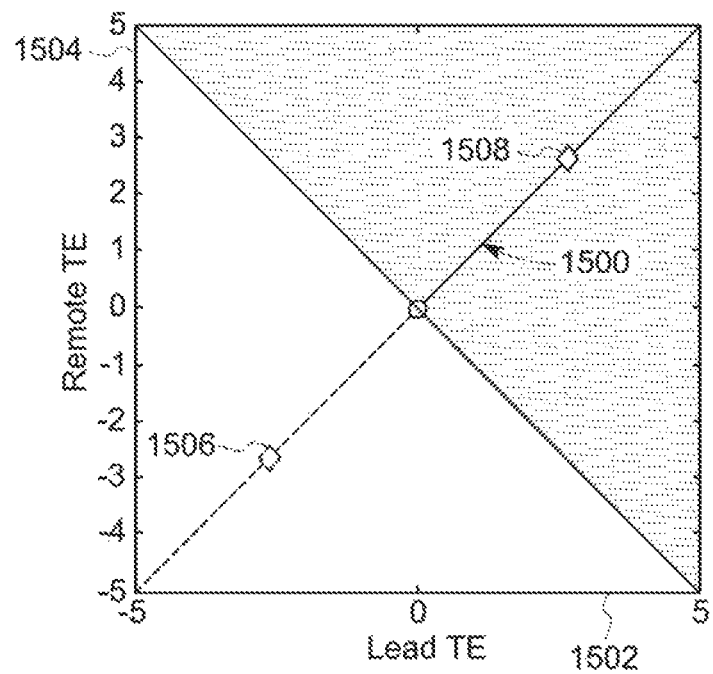
FIG. 15 illustrates alternate driving parameters that may be selected by the vehicle controller shown in FIG. 7 in response to the operations of the vehicle system shown in FIG. 1 deviating from the trip plan according to one example.

FIG. 15 illustrates alternate driving parameters 1500 that may be selected by the vehicle controller 706 shown in FIG. 7 in response to the operations of the vehicle system 100 deviating from the trip plan according to one example. The alternative driving parameters 1500 are shown alongside a horizontal axis 1502 representative of driving parameters of one set of vehicles 104 in the vehicle system 100 (e.g., the leading set of vehicles 104) and a vertical axis 1504 representative of driving parameters of another set of vehicles 104 in the same vehicle system 100 (e.g., the trailing set of vehicles 104). Positive numbers along the axes 1502, 1504 indicate throttle settings or propulsive efforts generated by the vehicles 104, while negative numbers along the axes 1502, 1504 indicate brake settings or braking efforts generated by the vehicles 104.

The alternate driving parameters 1500 shown in FIG. 15 extend along a line from a first combined driving parameter 1506 to a second combined driving parameter 1508. The first combined driving parameter 1506 represents the vehicles 104 in the two sets applying brakes at the same setting (e.g., approximately negative three) and the second combined driving parameter 1508 represents the vehicles 104 in the sets generating tractive effort with the throttles at the same setting (e.g., approximately positive three). The controller 706 may select a location along the line representing the alternate driving parameters 1500 responsive to the operations of the vehicle system 100 deviating from the trip plan.

For example, if additional tractive effort is needed to return the vehicle system 100 to traveling according to the trip plan, then the controller 706 may select driving parameters for the vehicles 104 along the line defining the alternate driving parameters 1500 that provide the additional tractive effort. Conversely, if additional braking effort is needed to return the vehicle system 100 to traveling according to the trip plan, then the controller 706 may select driving parameters for the vehicles 104 along the line defining the alternate driving parameters 1500 that provide the additional braking effort. In the illustrated example of the alternative driving parameters 1500, there are no collision lines. As a result, the controller 706 is able to select a variety of driving parameters from the alternative driving parameters 1500 without risking a node collision.

The alternate driving parameters that may be used by the controller 706 to return the vehicle system 100 to traveling according to the trip plan may vary based on location along the route 102. For example, the alternate driving parameters 1500 shown in FIG. 15 may be different for another location along the route 102.

Figure 16:
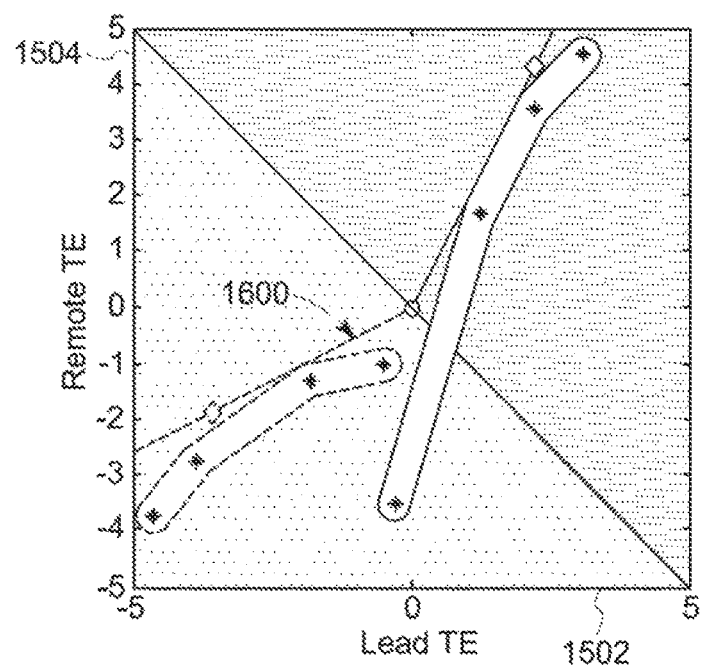
FIG. 16 illustrates alternate driving parameters that may be selected by the vehicle controller shown in FIG. 7 in response to the operations of the vehicle system shown in FIG. 1 deviating from the trip plan according to another example.

FIG. 16 illustrates alternate driving parameters 1600 that may be selected by the vehicle controller 706 shown in FIG. 7 in response to the operations of the vehicle system 100 deviating from the trip plan according to another example. The alternative driving parameters 1600 are shown alongside the axes 1502, 1504 described above. The alternate driving parameters 1600 may be defined by the processors 704 of the power control system 700 for a route location other than the route location associated with the alternative driving parameters 1500. The alternate driving parameters 1600 differ from the alternate driving parameters 1500 in that the alternate driving parameters 1600 extend along different combinations of driving parameters to avoid crossing collision lines 1602, 1604.

The collision lines 1602, 1604 may be similar to the collision lines 1300, 1302 shown in FIG. 13 in that the collision lines 1602, 1604 represent combined driving parameters of the vehicles 104 in the vehicle system 100 that result in one or more node collisions within the vehicle system 100. For example, changing the driving parameters of the vehicles 104 to cause the driving parameters to cross or extend into the collision line 1602 and/or 1604 results in a node collision within the vehicle system 100. In contrast to the collision lines 1300, 1302, the collision lines 1602, 1604 have a curved, or non-linear, shape. As a result, the alternate driving parameters 1600 extend along two different lines that do not extend along the same directions. One line of the alternative driving parameters 1600 extends from a lower braking limit 1606 (e.g., approximately braking settings of four for the vehicles 104 in the leading set and two for the vehicles 104 in the trailing set) to braking settings and throttle settings of zero, and another line of the alternate driving parameters 1600 extends from the braking settings and throttle settings of zero to an upper throttle limit 1608

(e.g., approximately throttle settings of two for the vehicles 104 in the leading set and four for the vehicles 104 in the trailing set).

The alternative driving parameters 1600 are defined by the collision lines 1602, 1604 in that the alternate driving parameters 1600 are disposed above the collision lines 1602, 1604 with respect to the throttle settings for the vehicles 104 in the trailing or remote set and to the left of the collision lines 1602, 1604 with respect to the brake settings for the vehicles 104 in the leading set. For example, the alternate driving parameters 1600 avoid defining driving parameters for the vehicles 104 that have smaller throttle settings or greater braking settings than defined by the collision lines 1602, 1604.

Returning to the description of the flowchart of the method 800 shown in FIG. 8, at 818, one or more alternate driving parameters are selected to return the vehicle system 100 to traveling according to the trip plan while avoiding a node collision within the vehicle system 100. The alternate driving parameters can be selected to avoid the collision lines 1300, 1302, 1602, 1604, as described above. The controller 706 can control the vehicle system 100 or instruct the operator of the vehicle system 100 to control the vehicle system 100 to use the alternate driving parameters to return to traveling according to the trip plan, while avoiding node collisions. Flow of the method 800 may return toward 812 so that the vehicle system 100 can continue moving according to the trip plan with the operations being monitored for deviations from the trip plan. Optionally, the method 800 may terminate, such as when the trip is completed.

Figure 17:
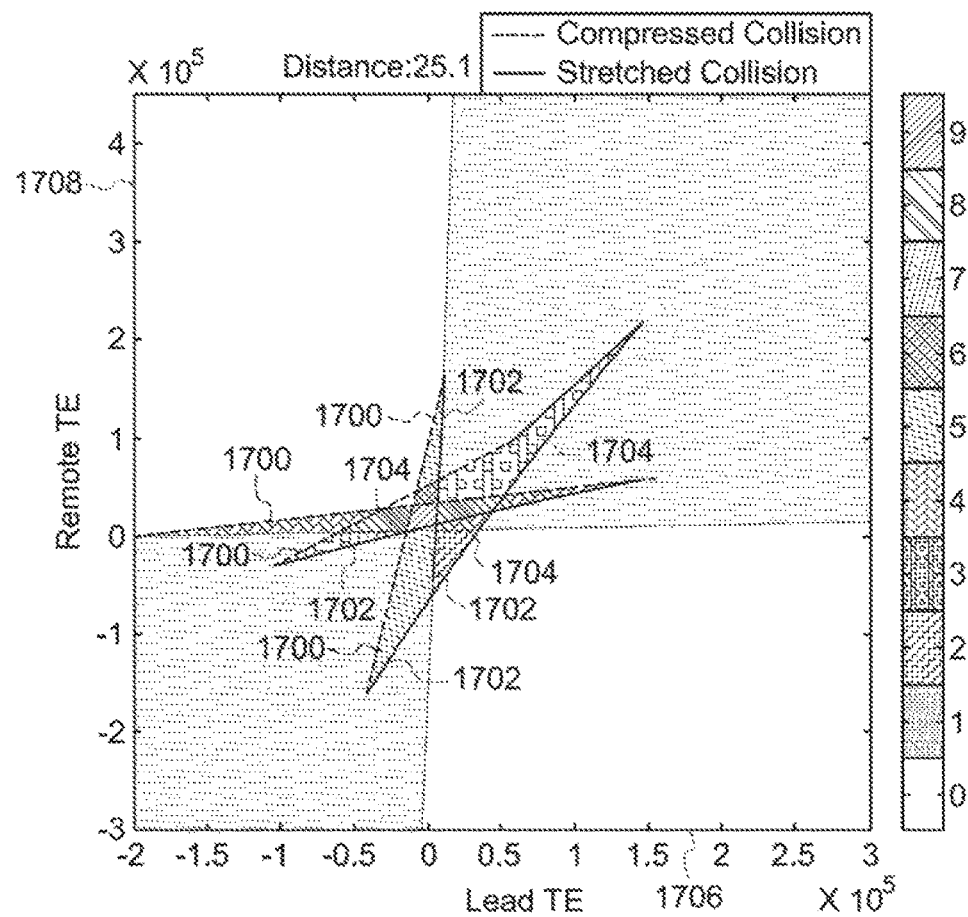
FIG. 17 illustrates one example of collision lines that define collision zones for travel of the vehicle system shown in FIG. 1.

FIG. 17 illustrates one example of collision lines 1700, 1702 that define collision zones 1704 for travel of the vehicle system 100 shown in FIG. 1. The collision lines 1700, 1702 and collision zones 1704 are shown alongside a horizontal axis 1706 representative of throttle and brake settings (e.g., driving parameters) for the vehicles 104 in the leading set of the vehicle system 100 and a vertical axis 1706 representative of throttle and brake settings (e.g., driving parameters) for the vehicles 104 in the trailing or remote set of the vehicle system 100.

The collision zones 1704 represent the areas between the collision lines 1700, 1702. Similar to the collision lines 1300, 1302, 1602, 1604 shown in FIGS. 13 and 16, the collision lines 1700, 1702 represent combined driving parameters that result in node collisions within the vehicle system 100. For example, changing the driving parameters of the vehicles 104 in the vehicle system 100 to cross the collision lines 1700, 1702 into or out of the collision zones 1704 results in a node collision within the vehicle system 100. The collision lines 1700, 1702 can represent different types of node collisions. The collision lines 1700 can represent node collisions that occur in a location in the vehicle system 100 between the leading and trailing sets of vehicles 104 resulting from the sets of vehicles 104 moving toward each other. This type of relative movement within the vehicle system 100 compresses one or more couplers 108 between the sets of vehicles 104. This type of node collision can be referred to as a compressed collision.

In contrast, the collision lines 1702 can represent node collisions that occur in a location in the vehicle system 100 between the leading and trailing sets of vehicles 104 resulting from the sets of vehicles 104 moving away each other within the vehicle system 100. This type of relative movement results in stretching one or more couplers 108 between the sets of vehicles 104. This type of node collision can be referred to as a stretched collision.

The compressed and stretched node collisions can be identified based on models of the vehicle system 100, based on previous travels of the vehicle system 100, or the like, as described above. The collision lines 1700, 1702 may be used to determine which driving parameters can and cannot be used at various locations during a trip of the vehicle system 100 to avoid different types of node collisions, as described above. When a node collision happens, the number of nodes (n) is reduced to (n−2), since two nodes have collided and disappeared. Based on the collision lines, the number of nodes for every combination of tractive effort can be mapped. The collision lines define collision zones and number of nodes in the vehicle system for the location represented by the collision lines.

The alternate driving parameters 1500 shown in FIG. 15 extend along a line from a first combined driving parameter 1506 to a second combined driving parameter 1508. The first combined driving parameter 1506 represents the vehicles 104 in the two sets applying brakes at the same setting (e.g., approximately negative three) and the second combined driving parameter 1508 represents the vehicles 104 in the sets generating tractive effort with the throttles at the same setting (e.g., approximately positive three). The controller 706 may select a location along the line representing the alternate driving parameters 1500 responsive to the operations of the vehicle system 100 deviating from the trip plan.

For example, if additional tractive effort is needed to return the vehicle system 100 to traveling according to the trip plan, then the controller 706 may select driving parameters for the vehicles 104 along the line defining the alternate driving parameters 1500 that provide the additional tractive effort. Conversely, if additional braking effort is needed to return the vehicle system 100 to traveling according to the trip plan, then the controller 706 may select driving parameters for the vehicles 104 along the line defining the alternate driving parameters 1500 that provide the additional braking effort. In the illustrated example of the alternative driving parameters 1500, there are no collision lines. As a result, the controller 706 is able to select a variety of driving parameters from the alternative driving parameters 1500 without risking a node collision.

In one embodiment, a power control system for a vehicle system includes one or more processors configured to identify coupler nodes in a vehicle system for travel of the vehicle system along a route. The coupler nodes are representative of slack states of couplers between vehicles in the vehicle system. The one or more processors also are configured to determine one or more combined driving parameters at one or more locations along the route where a state of one or more of the coupler nodes in the vehicle system will change within the vehicle system during the upcoming movement of the vehicle system. The one or more processors also are configured to determine a restriction on operations of the vehicle system to control the coupler nodes during the upcoming movement of the vehicle system and to distribute the one or more combined driving parameters among two or more of the vehicles by determining individual driving parameters for the two or more vehicles based on the restriction that is determined. The individual driving parameters include one or more throttle settings or brake settings of the vehicles.

Optionally, the driving parameters that are determined include one or more of a throttle setting of one or more of the vehicles, a brake setting of one or more of the vehicles, a moving speed of one or more of the vehicles, a tractive power generated by one or more of the vehicles, a tractive effort generated by one or more of the vehicles, a braking force generated by one or more of the vehicles, and/or an acceleration of one or more of the vehicles.

In one example, the couplers include at least one end of car cushioning coupler and the one or more processors are configured to determine the one or more combined driving parameters by determining where the state of the at least one end of car cushioning coupler changes. The coupler nodes optionally represent locations in the vehicle system where the vehicles move relative to each other within the vehicle system while the couplers between the vehicles remain in the slack states.

The one or more combined driving parameters at the one or more locations along the route where the state of the coupler nodes in the vehicle system changes are determined by the one or more processors based on one or more characteristics of the route or the vehicle system in one example. Optionally, the combined driving parameters represent synchronous power settings of the vehicles in a first set of the vehicles in the vehicle system and the vehicles in a different, second set of the vehicles in the vehicle system. The one or more processors are configured to determine the restriction on the operations of the vehicle system by determining one or more of a lower power limit or an upper power limit on at least one of the vehicles in the vehicle system in one example.

In one embodiment, a method for dictating power settings for a vehicle system includes identifying coupler nodes in a vehicle system for travel of the vehicle system along a route. The coupler nodes represent slack states of couplers connected to one or more vehicles in the vehicle system. The method also includes determining one or more combined driving parameters at one or more locations along the route where a state of one or more of the coupler nodes in the vehicle system will change within the vehicle system during the upcoming movement of the vehicle system and determining an individual driving parameter for one or more vehicles based on the restriction that is determined. The individual driving parameter include a power setting of the one or more vehicles.

Optionally, the individual driving parameter is determined for each of two or more of the vehicles. The driving parameters that are determined include one or more of a throttle setting of one or more of the vehicles, a brake setting of one or more of the vehicles, a moving speed of one or more of the vehicles, a tractive power generated by one or more of the vehicles, a tractive effort generated by one or more of the vehicles, a braking force generated by one or more of the vehicles, and/or an acceleration of one or more of the vehicles in one example.

Optionally, the couplers include at least one end of car cushioning coupler and determining the one or more combined driving parameters includes determining where the state of the at least one end of car cushioning coupler changes. The coupler nodes represent locations in the vehicle system where the vehicles move relative to each other within the vehicle system while the couplers between the vehicles remain in the slack states in one example. Optionally, one or more combined driving parameters at the one or more locations along the route where the state of the coupler nodes in the vehicle system changes are determined based on one or more characteristics of the route or the vehicle system.

The combined driving parameters can represent synchronous power settings of the vehicles in a first set of the vehicles in the vehicle system and the vehicles in a different, second set of the vehicles in the vehicle system. Optionally, determining the restriction on the operations of the vehicle system includes determining one or more of a lower power limit or an upper power limit on at least one of the vehicles in the vehicle system.

In one example, the method also can include determining one or more changes to the one or more combined driving parameters caused by one or more factors external to the vehicle system and re-distributing the one or more combined driving parameters among the two or more vehicles during travel of the vehicle system along the route. The method optionally includes presenting instructions to an operator of the vehicle system to direct the operator to control the vehicle system according to the individual driving parameters that are determined.

In one embodiment, a method for controlling a vehicle system includes determining a location along a route during an upcoming trip of a vehicle system that coupler nodes in the vehicle system will collide with each other and distributing a power output among two or more propulsion-generating vehicles on opposite sides of at least one of the coupler nodes in the vehicle system. The power output prevents the coupler nodes from colliding with each other at the location along the route. The method also includes generating a trip plan for the propulsion-generating vehicles in the vehicle system based on the power output that is distributed. The trip plan designates one or more moving speeds, throttle settings, or brake settings of the vehicle system as a function of distance along the route.

Optionally, the coupler nodes represent locations in the vehicle system where segments of one or more vehicles connected by a coupler in the vehicle system move relative to each other within the vehicle system while the coupler remains in a slack state. The power output represents a synchronous power setting for the propulsion-generating vehicles in the vehicle system to generate the power output in one example. Optionally, distributing the power output includes asynchronously distributing the power output among the propulsion-generating vehicles to cause the propulsion-generating vehicles to generate the total power output.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

What is claimed is:

1. A power control system for a vehicle system, the power control system comprising:
   one or more processors configured to identify coupler nodes in a vehicle system for travel of the vehicle system along a route, the coupler nodes representative of slack states of couplers between vehicles in the vehicle system, the one or more processors also configured to determine one or more combined driving parameters at one or more locations along the route where a state of one or more of the coupler nodes in the vehicle system will change within the vehicle system during the upcoming movement of the vehicle system, wherein the one or more processors also are configured to determine a restriction on operations of the vehicle system to control the coupler nodes during the upcoming movement of the vehicle system and to distribute the one or more combined driving parameters among two or more of the vehicles by determining individual driving parameters for the two or more vehicles based on the restriction that is determined.

2. The power control system of claim 1, wherein the driving parameters that are determined include one or more of a throttle setting of one or more of the vehicles, a brake setting of one or more of the vehicles, a moving speed of one or more of the vehicles, a tractive power generated by one or more of the vehicles, a tractive effort generated by one or more of the vehicles, a braking force generated by one or more of the vehicles, or an acceleration of one or more of the vehicles.

3. The power control system of claim 1, wherein the couplers include at least one end of car cushioning coupler and the one or more processors are configured to determine the one or more combined driving parameters by determining where the state of the at least one end of car cushioning coupler changes.

4. The power control system of claim 1, wherein the coupler nodes represent locations in the vehicle system where the vehicles move relative to each other within the vehicle system while the couplers between the vehicles remain in the slack states.

5. The power control system of claim 1, wherein the combined driving parameters represent synchronous power settings of the vehicles in a first set of the vehicles in the vehicle system and the vehicles in a different, second set of the vehicles in the vehicle system.

6. The power control system of claim 1, wherein the one or more processors are configured to determine the restriction on the operations of the vehicle system by determining one or more of a lower power limit or an upper power limit on at least one of the vehicles in the vehicle system.

7. The power control system of claim 1, wherein the one or more processors are configured to generate control signals to control the two or more vehicles according to the individual driving parameters that are determined based on the restriction.

8. A method for controlling a vehicle system, the method comprising:
   identifying coupler nodes in a vehicle system for travel of the vehicle system along a route, the coupler nodes representative of slack states of couplers connected to one or more vehicles in the vehicle system;
   determining one or more combined driving parameters at one or more locations along the route where a state of one or more of the coupler nodes in the vehicle system will change within the vehicle system during the upcoming movement of the vehicle system; and
   determining an individual driving parameter for one or more vehicles based on a restriction that is determined.

9. The method of claim 8, wherein the driving parameters that are determined include one or more of a throttle setting of one or more of the vehicles, a brake setting of one or more of the vehicles, a moving speed of one or more of the vehicles, a tractive power generated by one or more of the vehicles, a tractive effort generated by one or more of the vehicles, a braking force generated by one or more of the vehicles, or an acceleration of one or more of the vehicles.

10. The method of claim 8, wherein the coupler nodes represent locations in the vehicle system where the vehicles move relative to each other within the vehicle system while the couplers between the vehicles remain in the slack states.

11. The method of claim 8, wherein the combined driving parameters represent synchronous power settings of the vehicles in a first set of the vehicles in the vehicle system and the vehicles in a different, second set of the vehicles in the vehicle system.

12. The method of claim 8, wherein determining the restriction on the operations of the vehicle system includes determining one or more of a lower power limit or an upper power limit on at least one of the vehicles in the vehicle system.

13. A method for controlling a vehicle system, the method comprising:

determining a location along a route during an upcoming trip of a vehicle system that coupler nodes in the vehicle system will collide with each other;

distributing a power output among two or more propulsion-generating vehicles on opposite sides of at least one of the coupler nodes in the vehicle system, the power output preventing the coupler nodes from colliding with each other at the location along the route;

determining a restriction on operations of the vehicle system to control the coupler nodes; and generating a trip plan for the propulsion-generating vehicles in the vehicle system based on the power output that is distributed and the restriction on operations determined to control the coupler nodes.

14. The method of claim 13, wherein the coupler nodes represent locations in the vehicle system where segments of one or more vehicles connected by a coupler in the vehicle system move relative to each other within the vehicle system while the coupler remains in a slack state.

15. The method of claim 13, wherein the power output represents a synchronous power setting for the propulsion-generating vehicles in the vehicle system to generate the power output.

16. The method of claim 15, wherein distributing the power output includes asynchronously distributing the power output among the propulsion-generating vehicles to cause the propulsion-generating vehicles to generate the total power output.

* * * * *